(12) United States Patent
Cadiz et al.

(10) Patent No.: US 9,392,043 B2
(45) Date of Patent: Jul. 12, 2016

(54) ENHANCED TELEPHONY COMPUTER USER INTERFACE ALLOWING USER INTERACTION AND CONTROL OF A TELEPHONE USING A PERSONAL COMPUTER

(71) Applicant: Microsoft Technology Licensing, LLC, Redmond, WA (US)

(72) Inventors: Jonathan Jay Cadiz, Redmond, WA (US); Anoop Gupta, Woodinville, WA (US); Gavin Jancke, Sammamish, WA (US); Attila Narin, Bothell, WA (US); Michael Boyle, Calgary (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 274 days.

(21) Appl. No.: 14/244,326

(22) Filed: Apr. 3, 2014

(65) Prior Publication Data
US 2014/0211791 A1 Jul. 31, 2014

Related U.S. Application Data

(60) Continuation of application No. 13/612,134, filed on Sep. 12, 2012, now Pat. No. 8,694,915, which is a continuation of application No. 12/370,588, filed on Feb. 12, 2009, now abandoned, which is a division of application No. 10/445,395, filed on May 20, 2003, now abandoned.

(51) Int. Cl.
*H04L 29/06* (2006.01)
*G06F 3/048* (2013.01)
(Continued)

(52) U.S. Cl.
CPC ............ *H04L 65/604* (2013.01); *G06F 3/0483* (2013.01); *G06F 3/04842* (2013.01);
(Continued)

(58) Field of Classification Search
CPC .............. H04L 65/604; H04L 65/602; H04M 3/42042; H04M 11/00; H04M 1/2478; H04M 1/274516; H04M 1/2535; H04M 1/2473; H04M 1/575; H04M 2203/558; H04M 3/42068; H04M 2201/38; H04M 1/27455; H04M 2250/60; H04M 1/663; H04M 1/576; G06F 3/0483; G06F 3/04842
See application file for complete search history.

(56) References Cited

U.S. PATENT DOCUMENTS

| 4,438,527 A | 3/1984 | Hammond |
|---|---|---|
| 4,656,318 A | 4/1987 | Noyes |

(Continued)

FOREIGN PATENT DOCUMENTS

| CN | 1285674 | 2/2001 |
|---|---|---|
| CN | 1346199 | 4/2002 |

(Continued)

OTHER PUBLICATIONS

Office Action and Search Report Issued in Chinese Patent Application No. 201210407605.3, Mailed Date: Oct. 8, 2014, 12 pages.
(Continued)

*Primary Examiner* — Jordany Nunez
(74) *Attorney, Agent, or Firm* — Andrew Smith; Raghu Chinagudabha; Micky Minhas

(57) ABSTRACT

Enhanced telephony computer user interfaces seamlessly integrate and leverage the features of personal computers and telephones. The manner in which media is presented at a computing system can also be modified automatically in response to detected telephone operations. These modifications can include pausing media in response to a detected telephone call and/or adjusting a volume of the media presentation. The media presentation/volume can also be resumed/restored upon detecting that the telephone call has terminated.

20 Claims, 20 Drawing Sheets

(51) Int. Cl.

| | |
|---|---|
| *H04L 29/08* | (2006.01) |
| *H04N 7/14* | (2006.01) |
| *G06F 15/16* | (2006.01) |
| *H04M 1/247* | (2006.01) |
| *H04M 1/253* | (2006.01) |
| *H04M 1/2745* | (2006.01) |
| *H04M 1/57* | (2006.01) |
| *G06F 3/0483* | (2013.01) |
| *G06F 3/0484* | (2013.01) |
| *H04M 11/00* | (2006.01) |
| *H04M 3/42* | (2006.01) |
| *H04M 1/663* | (2006.01) |

(52) U.S. Cl.
CPC .......... *H04L65/602* (2013.01); *H04M 1/2473* (2013.01); *H04M 1/2478* (2013.01); *H04M 1/2535* (2013.01); *H04M 1/274516* (2013.01); *H04M 1/575* (2013.01); *H04M 3/42042* (2013.01); *H04M 11/00* (2013.01); *H04M 1/27455* (2013.01); *H04M 1/576* (2013.01); *H04M 1/663* (2013.01); *H04M 3/42068* (2013.01); *H04M 2201/38* (2013.01); *H04M 2203/558* (2013.01); *H04M 2250/60* (2013.01)

(56) References Cited

U.S. PATENT DOCUMENTS

| | | | |
|---|---|---|---|
| 4,860,342 A | 8/1989 | Danner | |
| 5,128,987 A | 7/1992 | McDonough | |
| 5,159,445 A | 10/1992 | Gitlin | |
| 5,327,486 A | 7/1994 | Wolff et al. | |
| 5,388,268 A | 2/1995 | Beach | |
| 5,412,417 A | 5/1995 | Tozuka | |
| 5,487,181 A | 1/1996 | Dailey | |
| 5,491,800 A | 2/1996 | Goldsmith | |
| 5,519,772 A | 5/1996 | Akman | |
| 5,528,673 A | 6/1996 | Rosenthal | |
| 5,533,115 A | 7/1996 | Hollenbach | |
| 5,542,102 A | 7/1996 | Smith | |
| 5,546,538 A | 8/1996 | Cobbley | |
| 5,568,540 A | 10/1996 | Grecko | |
| 5,657,414 A | 8/1997 | Lett | |
| 5,671,267 A * | 9/1997 | August | H04M 1/72502 379/102.03 |
| 5,675,374 A | 10/1997 | Kohda | |
| 5,675,810 A | 10/1997 | Sellers | |
| 5,694,467 A | 12/1997 | Young | |
| 5,712,911 A | 1/1998 | Her | |
| 5,727,047 A | 3/1998 | Bentley | |
| 5,732,216 A | 3/1998 | Logan | |
| 5,734,706 A | 3/1998 | Windsor et al. | |
| 5,745,761 A | 4/1998 | Celi | |
| 5,754,636 A | 5/1998 | Bayless et al. | |
| 5,757,901 A | 5/1998 | Hiroshige | |
| 5,764,901 A | 6/1998 | Skarbo | |
| 5,768,164 A | 6/1998 | Hollon, Jr. | |
| 5,802,305 A | 9/1998 | McKaughan | |
| 5,831,606 A | 11/1998 | Nakajima | |
| 5,907,604 A | 5/1999 | Hsu | |
| 5,930,700 A | 7/1999 | Pepper et al. | |
| 5,943,055 A | 8/1999 | Sylvan | |
| 5,953,485 A | 9/1999 | Abecassis | |
| 5,959,622 A | 9/1999 | Greer | |
| 5,978,837 A | 11/1999 | Foladare | |
| 5,987,106 A * | 11/1999 | Kitamura | H04L 12/2803 379/102.02 |
| 5,991,822 A | 11/1999 | Mealey | |
| 5,991,836 A | 11/1999 | Renda | |
| 5,999,613 A | 12/1999 | Nabkel | |
| 6,006,115 A | 12/1999 | Wingate | |
| 6,006,285 A | 12/1999 | Jacobs | |
| 6,008,806 A | 12/1999 | Nakajima | |
| 6,018,570 A | 1/2000 | Matison | |
| 6,018,571 A | 1/2000 | Langlois | |
| 6,026,158 A | 2/2000 | Bayless et al. | |
| 6,052,442 A | 4/2000 | Cooper | |
| 6,058,415 A | 5/2000 | Polcyn | |
| 6,088,717 A | 7/2000 | Reed | |
| 6,091,812 A | 7/2000 | Iglehart | |
| 6,101,610 A | 8/2000 | Beebe | |
| 6,118,856 A | 9/2000 | Paarsmarkt | |
| 6,144,363 A | 11/2000 | Alloul | |
| 6,144,644 A | 11/2000 | Bajzath | |
| 6,160,550 A | 12/2000 | Nakajima | |
| 6,172,703 B1 | 1/2001 | Lee | |
| 6,192,340 B1 | 2/2001 | Abecassis | |
| 6,208,373 B1 | 3/2001 | Fong | |
| 6,215,420 B1 | 4/2001 | Harrison | |
| 6,237,846 B1 | 5/2001 | Lowell | |
| 6,240,168 B1 | 5/2001 | Stanford | |
| 6,259,449 B1 | 7/2001 | Saxena et al. | |
| 6,266,714 B1 | 7/2001 | Jacobs | |
| 6,279,056 B1 | 8/2001 | Jacobs | |
| 6,282,435 B1 | 8/2001 | Wagner | |
| 6,285,891 B1 | 9/2001 | Hoshino | |
| 6,298,127 B1 | 10/2001 | Petrunka | |
| 6,346,934 B1 | 2/2002 | Wugofski | |
| 6,362,440 B1 | 3/2002 | Karidis | |
| 6,380,968 B1 | 4/2002 | Alexander | |
| 6,390,371 B1 | 5/2002 | Armga | |
| 6,404,860 B1 | 6/2002 | Casellini | |
| 6,407,325 B2 * | 6/2002 | Yi | G10H 1/0041 84/600 |
| 6,417,849 B2 | 7/2002 | Lefebvre | |
| 6,438,216 B1 | 8/2002 | Aktas | |
| 6,438,585 B2 | 8/2002 | Mousseau | |
| 6,445,694 B1 | 9/2002 | Swartz | |
| 6,453,027 B1 | 9/2002 | Kang | |
| 6,459,782 B1 | 10/2002 | Bedrosian et al. | |
| 6,463,145 B1 | 10/2002 | O'Neal et al. | |
| 6,477,374 B1 | 11/2002 | Shaffer et al. | |
| 6,483,905 B1 | 11/2002 | Kikinis | |
| 6,484,019 B1 | 11/2002 | Aklian | |
| 6,496,860 B2 | 12/2002 | Ludtke | |
| 6,507,356 B1 | 1/2003 | Jackel | |
| 6,510,209 B1 * | 1/2003 | Cannon | H04M 11/007 379/102.03 |
| 6,513,128 B1 | 1/2003 | Wang | |
| 6,516,356 B1 | 2/2003 | Belknap | |
| 6,518,957 B1 | 2/2003 | Lehtinen | |
| 6,519,335 B1 | 2/2003 | Bushnell | |
| 6,526,274 B1 | 2/2003 | Fickes et al. | |
| 6,529,742 B1 | 3/2003 | Yang | |
| 6,546,262 B1 | 4/2003 | Freadman | |
| 6,549,612 B2 | 4/2003 | Gifford et al. | |
| 6,549,621 B1 | 4/2003 | Christie, IV et al. | |
| 6,563,914 B2 | 5/2003 | Sammon et al. | |
| 6,564,270 B1 | 5/2003 | Andert | |
| 6,573,705 B1 | 6/2003 | Tajima et al. | |
| 6,594,354 B1 | 7/2003 | Kelly | |
| 6,603,855 B1 | 8/2003 | Cannon | |
| 6,621,800 B1 | 9/2003 | Klein | |
| 6,628,194 B1 | 9/2003 | Hellebust | |
| 6,628,267 B2 | 9/2003 | Karidis | |
| 6,628,964 B1 * | 9/2003 | Bates | H04B 1/202 340/539.11 |
| 6,658,095 B1 | 12/2003 | Yoakum | |
| 6,662,022 B1 | 12/2003 | Kanamori et al. | |
| 6,671,356 B2 | 12/2003 | Lewis | |
| 6,671,743 B1 | 12/2003 | Verity | |
| 6,674,457 B1 | 1/2004 | Davies | |
| 6,675,640 B2 | 1/2004 | Ehrlich et al. | |
| 6,680,845 B2 | 1/2004 | Agata | |
| 6,687,348 B2 | 2/2004 | Cromer | |
| 6,690,778 B2 | 2/2004 | Kahn | |
| 6,691,233 B1 | 2/2004 | Gannage | |
| 6,718,183 B1 | 4/2004 | Blust | |
| 6,731,316 B2 | 5/2004 | Herigstad | |
| 6,732,365 B2 | 5/2004 | Belknap | |
| 6,741,232 B1 | 5/2004 | Siedlikowski | |
| 6,747,970 B1 | 6/2004 | Lamb et al. | |
| 6,757,372 B1 | 6/2004 | Dunlap | |

(56) References Cited

U.S. PATENT DOCUMENTS

| | | | |
|---|---|---|---|
| 6,778,661 B1 | 8/2004 | Yumoto et al. |
| 6,782,086 B2 | 8/2004 | Clapper |
| 6,806,867 B1 | 10/2004 | Arruda |
| 6,811,940 B2 | 11/2004 | Kita et al. |
| 6,813,344 B1 | 11/2004 | Lemke |
| 6,816,881 B1 | 11/2004 | Mohindra |
| 6,819,961 B2 | 11/2004 | Jacobs |
| 6,831,657 B2 | 12/2004 | Tsutsumi |
| 6,845,151 B2 | 1/2005 | Peng |
| 6,871,214 B2 | 3/2005 | Parsons et al. |
| 6,882,326 B2 | 4/2005 | Hirayama |
| 6,882,724 B2 | 4/2005 | Hartmeier |
| 6,888,562 B2 | 5/2005 | Rambo |
| 6,891,940 B1 | 5/2005 | Bhandari |
| 6,892,074 B2 | 5/2005 | Tarkiainen |
| 6,897,851 B2 | 5/2005 | Carini |
| 6,902,332 B2 | 6/2005 | McLoone |
| 6,912,283 B2 | 6/2005 | Meyerson |
| 6,918,123 B1 | 7/2005 | Shteyn |
| 6,931,007 B2 | 8/2005 | Jones |
| 6,937,950 B2 | 8/2005 | Cragun |
| 6,938,174 B2 | 8/2005 | LeKuch |
| 6,947,728 B2* | 9/2005 | Tagawa | H04M 19/041 379/207.02 |
| 6,950,119 B2 | 9/2005 | Kakii |
| 6,952,830 B2 | 10/2005 | Madineni |
| 6,954,696 B2 | 10/2005 | Ihara |
| 6,970,556 B2 | 11/2005 | Wall |
| 6,973,167 B2 | 12/2005 | Kikinis |
| 6,976,216 B1 | 12/2005 | Peskin |
| 6,978,439 B2 | 12/2005 | Kelley |
| 6,980,641 B1 | 12/2005 | Stanford |
| 6,993,349 B2 | 1/2006 | Martinez |
| 6,996,445 B1 | 2/2006 | Kamijo |
| 7,000,237 B1 | 2/2006 | Sinha |
| 7,012,652 B1* | 3/2006 | Weber | H04N 5/44 348/632 |
| 7,013,003 B2 | 3/2006 | Seligmann |
| 7,035,248 B2 | 4/2006 | Wengrovitz |
| 7,036,110 B2 | 4/2006 | Jeyaraman |
| 7,068,641 B1 | 6/2006 | Allan |
| 7,085,814 B1 | 8/2006 | Gandhi |
| 7,092,385 B2 | 8/2006 | Gallant et al. |
| 7,096,391 B2 | 8/2006 | Johnson |
| 7,106,472 B2 | 9/2006 | Gomez |
| 7,106,851 B2 | 9/2006 | Tang et al. |
| 7,120,238 B1 | 10/2006 | Bednarz |
| 7,123,370 B2 | 10/2006 | Watanabe |
| 7,123,936 B1 | 10/2006 | Rydbeck |
| 7,145,899 B1 | 12/2006 | Pearce et al. |
| 7,149,512 B2 | 12/2006 | Connor |
| 7,184,522 B2 | 2/2007 | Brunelle |
| 7,194,611 B2 | 3/2007 | Bear |
| 7,197,120 B2 | 3/2007 | Luehrig et al. |
| 7,209,133 B2 | 4/2007 | Eglit |
| 7,213,073 B1 | 5/2007 | Slavin |
| 7,216,221 B2 | 5/2007 | Bear |
| 7,221,331 B2 | 5/2007 | Bear |
| 7,227,511 B2 | 6/2007 | Adan |
| 7,231,229 B1 | 6/2007 | Hawkins |
| 7,240,228 B2 | 7/2007 | Bear |
| 7,243,130 B2 | 7/2007 | Horvitz |
| 7,257,201 B2 | 8/2007 | Singh et al. |
| 7,272,660 B1 | 9/2007 | Powers |
| 7,292,588 B2 | 11/2007 | Milley |
| 7,302,637 B1 | 11/2007 | Maguire |
| 7,372,371 B2 | 5/2008 | Bear |
| 7,376,124 B2 | 5/2008 | Lee et al. |
| 7,376,932 B2 | 5/2008 | Chen |
| 7,401,053 B2 | 7/2008 | Kamimura |
| 7,424,740 B2 | 9/2008 | Bear |
| 7,440,556 B2 | 10/2008 | Bear |
| 7,443,971 B2 | 10/2008 | Bear |
| 7,519,911 B2 | 4/2009 | Friedman |
| 7,548,255 B2 | 6/2009 | Bear |
| 7,549,154 B2 | 6/2009 | Rhoten |
| 7,551,199 B2 | 6/2009 | Bear |
| 7,573,988 B2 | 8/2009 | Lee et al. |
| 7,577,429 B2 | 8/2009 | Bear |
| 7,581,034 B2 | 8/2009 | Polivy |
| 7,624,259 B2 | 11/2009 | Bear |
| 7,634,780 B2 | 12/2009 | Rhoten |
| 7,697,506 B2 | 4/2010 | Narin et al. |
| 7,702,363 B2 | 4/2010 | Cao |
| 7,711,868 B2 | 5/2010 | Rhoten |
| 7,778,595 B2 | 8/2010 | White |
| 7,784,065 B2 | 8/2010 | Polivy |
| 7,827,232 B2 | 11/2010 | Bear |
| 7,913,182 B2 | 3/2011 | Bear |
| 7,945,284 B1 | 5/2011 | Cao |
| 8,127,125 B2 | 2/2012 | Bear |
| 8,195,142 B1 | 6/2012 | Fujisaki |
| 8,443,179 B2 | 5/2013 | Bear |
| 8,635,554 B2 | 1/2014 | Cadiz |
| 2001/0002831 A1 | 6/2001 | Kato et al. |
| 2001/0033647 A1 | 10/2001 | Veschi |
| 2001/0034251 A1 | 10/2001 | Goto |
| 2001/0040551 A1 | 11/2001 | Yates |
| 2002/0004855 A1 | 1/2002 | Cox |
| 2002/0015003 A1 | 2/2002 | Kato et al. |
| 2002/0015020 A1 | 2/2002 | Mobin |
| 2002/0019812 A1 | 2/2002 | Board |
| 2002/0021790 A1 | 2/2002 | Corbett et al. |
| 2002/0032907 A1 | 3/2002 | Daniels |
| 2002/0039426 A1 | 4/2002 | Takemoto et al. |
| 2002/0045438 A1* | 4/2002 | Tagawa | H04M 1/72519 455/412.1 |
| 2002/0069249 A1 | 6/2002 | Pedersen |
| 2002/0073207 A1 | 6/2002 | Widger et al. |
| 2002/0080967 A1 | 6/2002 | Abdo |
| 2002/0087225 A1 | 7/2002 | Howard |
| 2002/0087643 A1 | 7/2002 | Parsons et al. |
| 2002/0093683 A1 | 7/2002 | Focazio |
| 2002/0099456 A1 | 7/2002 | McLean |
| 2002/0110121 A1 | 8/2002 | Mishra |
| 2002/0114430 A1 | 8/2002 | Murata |
| 2002/0131072 A1 | 9/2002 | Jackson |
| 2002/0132638 A1 | 9/2002 | Plahte et al. |
| 2002/0140627 A1 | 10/2002 | Ohki et al. |
| 2002/0144191 A1 | 10/2002 | Lin |
| 2002/0162116 A1 | 10/2002 | Read et al. |
| 2002/0167458 A1 | 11/2002 | Baudisch |
| 2002/0167460 A1 | 11/2002 | Baudisch |
| 2003/0025674 A1 | 2/2003 | Watanabe |
| 2003/0026403 A1 | 2/2003 | Clapper |
| 2003/0041332 A1 | 2/2003 | Allen et al. |
| 2003/0046448 A1 | 3/2003 | Fischer |
| 2003/0053444 A1 | 3/2003 | Swartz |
| 2003/0055974 A1 | 3/2003 | Brophy et al. |
| 2003/0074590 A1 | 4/2003 | Fogle |
| 2003/0112325 A1 | 6/2003 | Boyden |
| 2003/0118003 A1 | 6/2003 | Geck |
| 2003/0122874 A1 | 7/2003 | Dieberger |
| 2003/0146903 A1 | 8/2003 | Yi |
| 2003/0188041 A1 | 10/2003 | Fillmore |
| 2003/0197685 A1 | 10/2003 | Yi |
| 2004/0001087 A1 | 1/2004 | Warmus |
| 2004/0001101 A1 | 1/2004 | Trajkovic et al. |
| 2004/0027375 A1 | 2/2004 | Ellis |
| 2004/0052341 A1 | 3/2004 | Yeh |
| 2004/0076272 A1 | 4/2004 | Zafar et al. |
| 2004/0103144 A1 | 5/2004 | Sallam |
| 2004/0110490 A1 | 6/2004 | Steele |
| 2004/0135819 A1 | 7/2004 | Maa |
| 2004/0141012 A1 | 7/2004 | Tootill |
| 2004/0155956 A1 | 8/2004 | Libbey |
| 2004/0176132 A1* | 9/2004 | Thrasher | H04L 12/2803 455/556.1 |
| 2004/0177361 A1 | 9/2004 | Bernhard |
| 2004/0194146 A1* | 9/2004 | Bates | H04N 7/147 725/110 |
| 2004/0203353 A1* | 10/2004 | Connor | H04M 1/72533 455/41.1 |
| 2004/0210628 A1 | 10/2004 | Inkinen |

(56) References Cited

U.S. PATENT DOCUMENTS

| | | | |
|---|---|---|---|
| 2004/0222978 A1 | 11/2004 | Bear | |
| 2004/0223058 A1 | 11/2004 | Richter | |
| 2004/0240167 A1 | 12/2004 | Ledbetter | |
| 2004/0240650 A1 | 12/2004 | Bear | |
| 2004/0266426 A1 | 12/2004 | Marsh | |
| 2005/0005067 A1 | 1/2005 | Culter | |
| 2005/0032507 A1 | 2/2005 | Na | |
| 2005/0047395 A1 | 3/2005 | Narin et al. | |
| 2005/0063520 A1 | 3/2005 | Michaelis | |
| 2005/0135342 A1 | 6/2005 | Kim | |
| 2005/0174364 A1 | 8/2005 | Malmstrom | |
| 2005/0182822 A1 | 8/2005 | Daniel | |
| 2005/0186942 A1 | 8/2005 | Griffin | |
| 2005/0193396 A1 | 9/2005 | Stafford-Fraser | |
| 2005/0259032 A1 | 11/2005 | Morris | |
| 2005/0262302 A1 | 11/2005 | Fuller | |
| 2006/0048062 A1 | 3/2006 | Adamson | |
| 2006/0061516 A1 | 3/2006 | Campbell | |
| 2006/0095525 A1 | 5/2006 | Mousseau | |
| 2006/0100978 A1 | 5/2006 | Heller | |
| 2006/0168355 A1 | 7/2006 | Shenfield et al. | |
| 2006/0230421 A1* | 10/2006 | Pierce | H04B 1/202 725/106 |
| 2006/0236221 A1 | 10/2006 | McCausland | |
| 2006/0242590 A1 | 10/2006 | Polivy | |
| 2006/0284787 A1 | 12/2006 | Bear | |
| 2007/0071257 A1 | 3/2007 | Bear | |
| 2008/0112567 A1 | 5/2008 | Siegel | |
| 2009/0036108 A1* | 2/2009 | Cho | G06F 9/4843 455/418 |
| 2009/0214014 A1 | 8/2009 | Cadiz | |
| 2009/0305695 A1 | 12/2009 | Bear | |
| 2010/0008488 A1 | 1/2010 | Bear | |
| 2010/0010653 A1 | 1/2010 | Bear | |
| 2010/0054432 A1 | 3/2010 | Brahm | |
| 2010/0144389 A1 | 6/2010 | Cao | |
| 2011/0301728 A1 | 12/2011 | Hamilton et al. | |
| 2013/0022038 A1 | 1/2013 | Cadiz | |

FOREIGN PATENT DOCUMENTS

| | | |
|---|---|---|
| CN | 1346200 | 4/2002 |
| EP | 0196815 A2 | 10/1986 |
| EP | 0772327 A2 | 5/1997 |
| EP | 0777394 A1 | 6/1997 |
| EP | 0816990 | 1/1998 |
| EP | 0838934 A1 | 4/1998 |
| EP | 0772327 A3 | 2/1999 |
| EP | 1071295 A2 | 1/2001 |
| EP | 1475731 A1 | 11/2004 |
| FR | 2824980 | 11/2002 |
| JP | 63087898 | 4/1988 |
| JP | 63280524 | 11/1988 |
| JP | 1190062 | 7/1989 |
| JP | 02177642 | 7/1990 |
| JP | 05095392 | 4/1993 |
| JP | 07182372 | 7/1995 |
| JP | 08317076 | 11/1996 |
| JP | 09153929 | 6/1997 |
| JP | 9289526 | 11/1997 |
| JP | 9512690 | 12/1997 |
| JP | 10240656 | 9/1998 |
| JP | 11098252 | 4/1999 |
| JP | 11161706 | 6/1999 |
| JP | 11331895 | 11/1999 |
| JP | 2000261554 | 9/2000 |
| JP | 2000341414 | 12/2000 |
| JP | 2001043690 | 2/2001 |
| JP | 2001100838 | 4/2001 |
| JP | 2001169319 | 6/2001 |
| JP | 2001339527 | 7/2001 |
| JP | 2001320748 | 11/2001 |
| JP | 2001519101 | 11/2001 |
| JP | 2002033800 | 1/2002 |
| JP | 2002064639 | 2/2002 |
| JP | 2002101183 | 4/2002 |
| JP | 200219070 | 7/2002 |
| JP | 2002218058 | 8/2002 |
| JP | 2002232566 | 8/2002 |
| JP | 2002354518 | 12/2002 |
| JP | 2002374354 | 12/2002 |
| JP | 2003188978 | 7/2003 |
| JP | 2003219010 | 7/2003 |
| JP | 2003219469 | 7/2003 |
| JP | 2003283693 | 10/2003 |
| JP | 2003296522 | 10/2003 |
| JP | 2003324543 | 11/2003 |
| KR | 20010111729 | 12/2001 |
| KR | 20020036476 | 5/2002 |
| WO | WO9602049 A1 | 1/1996 |
| WO | WO 00/49794 | 8/2000 |
| WO | WO 0108383 A1 | 2/2001 |
| WO | WO 0161946 A1 | 8/2001 |
| WO | WO 01/69387 | 9/2001 |
| WO | WO 02/093892 | 11/2002 |
| WO | WO 03/085960 | 10/2003 |

OTHER PUBLICATIONS

Babbage et al., "Internet phone—changing the telephony paradigm?", BT Technology Journal, vol. 15, No. 2, Apr. 1997, 13 pages.
Office Action dated Jan. 29, 2015 cited in U.S. Appl. No. 14/158,602.
Office Action dated Jul. 21, 2015 cited in U.S. Appl. No. 14/158,602.
U.S. Appl. No. 14/158,602, filed Jan. 17, 2014, Cadiz et al.
Oxford on-line dictionary, http://dictionary.oed.com/entrance.dtl, Oxford University Press Oct. 2007, on the definition of the word "physical" under III/7b.
Anonymous, International Search Report in Corresponding EP Application No. EP 04 00 9868. Mar. 2007.
Fox et al., "Integrating Information Appliances into an Interactive Workspace," 2000, IEEE Computer Graphics and Applications, May/Jun. 2000. vol. 20, Iss.3, p. 54-65.
Chung-Hsien Wu et al., Intelligent Call Manager Based on the Integration of Computer Telephony, Internet and Speech Processing, Jun. 1998, Consumer Electronics, Digest of Technical Papers. p. 86-87.
Partial European Search Report for EP Application No. 04012125, Applicant: Microsoft Corporation, Mailing Date: Jul. 27, 2010, 5 pages.
Ericsson Enterprise brochure entitled, "BusinessPhone Computer Telephony Platforms," produced in Aug. 2003, http://www.ericsson.comwenter-risellibrary/brochuresdatasheets/-buisiness-hone1/0-2-3 676.pdf.
European Search Report for EP Application No. 04 02 0332, Dec. 8, 2004.
Genesys tutorial entitled, "Network Computer-Telephony (CTI) Delivering Intelligent Network (IN) Services," http://www.komunikasi.org/acrobat/service/Network_CTI.pdf. [Last Accessed Mar. 22, 2010].
"Advanced Call Center: Computer Answering Machine Software," http://www.voicecallcentral.com/advancescallcanter.htm, [Last Accessed May 19, 2004].
"Audio Conferencing and Web Presentation Solutions from edial," http://www.edial.com/, [Last Accessed May 19, 2004].
"Computer Answering Machine Software," http://www.voicecallcentral.com, [Last Accessed May 19, 2004].
"Computer Telephony Integration CTI," http://seimens.com/index.jsp?sdcP=pHPo1467fcis4mnu0, [Last Accessed May 19, 2004].
"Computer Telephony Integration," http://toshiba.com/taistsd/pages/prd_cti_main.html, [Last Accessed May 19, 2004].
"Computer Telephony Integration," http://databasesystemsscorp.com/pscti.htm, [Last Accessed May 19, 2004].
"CTI-Computer Telephony Integration-Smartphone," http://www.oak.com.uk/cti2.htm, [Last Accessed May 19, 2004].
"e-Zest Solutions," http://www.e-zest.net/cti-India.html, [Last Accessed May 19, 2004].
"Get Virtual, Stay Connected," http://www.alexis.com/, [Last Accessed May 19, 2004].

(56) References Cited

OTHER PUBLICATIONS

Kaukonen, Saku, "Software Agents for Mobile Computer Telephone Integration," http://control.hut.fi/Hvotvniemi/Publications/2OOOarpakannus?SakuKauukonen.pdf, pp. 18/21, Feb. 2000.
Kehradpir et al., U.S. Appl. No. 60/275,031, filed Mar. 13, 2001, pp. 1-11 and drawings.
Lucent Technologies paper entitled, "CTI Computer Technologies Integration," in Index, pp. 1-12, Dec. 2000, http://www.aetech.co.uk/Products/telecomslctibrochure.pdf.
Matsushima, H., Toshiyuki, S., and Toshiaki, K., "Integration of Computer Networks and Class Telephony Systems—computer Telephony Integration," In Itachi Review, vol. 48 (Jan. 1998), No. 2, pp. 55-58.
Strathmeyer, Carl R., "Choosing a Computer-Telephone Server," originally published in the 1996 International VoicePower Directory and Buyer's Guide, pp. 24-26, Feb. 1996, http://www.intel.com/network/csp--df/vp96.pdf.
Zafar et al., "Appendix for United States provisional patent application for method and apparatus for a unified communication manger via instant messaging," Mar. 13, 2001.
U.S. Appl. No. 11/685,014, Apr. 3, 2009, Office Action.
U.S. Appl. No. 11/685,014, Jul. 21, 2009, Notice of Allowance.
U.S. Appl. No. 10/429,931, Mar. 26, 2007, Office Action.
U.S. Appl. No. 10/429,931, Sep. 7, 2007, Notice of Allowance.
U.S. Appl. No. 10/429,931, Jan. 30, 2008, Notice of Allowance.
U.S. Appl. No. 10/996,557, Jul. 27, 2007, Office Action.
U.S. Appl. No. 10/996,557, Mar. 21, 2008, Office Action.
U.S. Appl. No. 10/996,557, Nov. 6, 2008, Office Action.
U.S. Appl. No. 10/996,557, Oct. 5, 2009, Notice of Allowance.
U.S. Appl. No. 10/996,371, Aug. 8, 2007, Office Action.
U.S. Appl. No. 10/996,371, Feb. 28, 2008, Office Action.
U.S. Appl. No. 10/996,371, Oct. 1, 2008, Office Action.
U.S. Appl. No. 10/996,371, Apr. 16, 2009, Notice of Allowance.
U.S. Appl. No. 10/429,932, Aug. 9, 2005, Office Action.
U.S. Appl. No. 10/429,932, Oct. 4, 2005, Office Action.
U.S. Appl. No. 10/429,932, Mar. 17, 2006, Office Action.
U.S. Appl. No. 10/429,932, Aug. 15, 2006, Office Action.
U.S. Appl. No. 10/429,932, Jan. 25, 2007, Notice of Allowance.
U.S. Appl. No. 10/429,943, Jul. 6, 2007, Office Action.
U.S. Appl. No. 10/429,943, Sep. 28, 2007, Office Action.
U.S. Appl. No. 10/429,943, Mar. 26, 2008, Office Action.
U.S. Appl. No. 10/429,943, Aug. 6, 2008, Office Action.
U.S. Appl. No. 10/429,943, Feb. 6, 2007, Office Action.
U.S. Appl. No. 10/429,943, Feb. 6, 2009, Notice of Allowance.
U.S. Appl. No. 10/429,943, Apr. 6, 2009, Notice of Allowance.
U.S. Appl. No. 10/677,118, Mar. 18, 2008, Office Action.
U.S. Appl. No. 10/677,118, Nov. 28, 2008, Office Action.
U.S. Appl. No. 10/677,118, Mar. 19, 2009, Notice of Allowance.
U.S. Appl. No. 10/429,903, Jan. 3, 2007, Office Action.
U.S. Appl. No. 10/429,903, Oct. 15, 2007, Office Action.
U.S. Appl. No. 10/429,903, Apr. 24, 2008, Notice of Allowance.
U.S. Appl. No. 10/429,933, Sep. 24, 2007, Office Action.
U.S. Appl. No. 10/429,933, Feb. 15, 2008, Office Action.
U.S. Appl. No. 10/429,933, Aug. 20, 2008, Office Action.
U.S. Appl. No. 10/429,933, Mar. 6, 2007, Office Action.
U.S. Appl. No. 10/429,905, Feb. 14, 2007, Office Action.
U.S. Appl. No. 10/429,905, May 21, 2007, Office Action.
U.S. Appl. No. 11/837,302, May 15, 2008, Office Action.
U.S. Appl. No. 11/837,302, Jan. 2, 2009, Office Action.
U.S. Appl. No. 11/837,302, Mar. 24, 2009, Notice of Allowance.
U.S. Appl. No. 10/429,930, Apr. 4, 2006, Office Action.
U.S. Appl. No. 10/429,930, Jul. 14, 2006, Office Action.
U.S. Appl. No. 10/429,930, Nov. 14, 2006, Office Action.
U.S. Appl. No. 10/429,930, Mar. 16, 2007, Notice of Allowance.
U.S. Appl. No. 11/509,431, Oct. 20, 2008, Office Action.
U.S. Appl. No. 11/509,431, Apr. 24, 2009, Office Action.
U.S. Appl. No. 11/509,431, Sep. 25, 2009, Office Action.
U.S. Appl. No. 11/509,437, Oct. 15, 2008, Office Action.
U.S. Appl. No. 11/509,437, Apr. 15, 2009, Office Action.
U.S. Appl. No. 11/509,437, Sep. 15, 2009, Office Action.
U.S. Appl. No. 10/430,369, Sep. 26, 2006, Office Action.
U.S. Appl. No. 10/430,369, Mar. 20, 2007, Office Action.
U.S. Appl. No. 10/430,369, Jul. 30, 2007, Office Action.
U.S. Appl. No. 10/430,369, Apr. 23, 2008, Notice of Allowance.
U.S. Appl. No. 10/677,084, Aug. 10, 2005, Office Action.
U.S. Appl. No. 10/677,084, Jan. 19, 2006, Office Action.
U.S. Appl. No. 10/677,084, Jul. 31, 2007, Office Action.
U.S. Appl. No. 10/677,084, Jan. 11, 2008, Office Action.
U.S. Appl. No. 10/677,084, Apr. 29, 2008, Notice of Allowance.
U.S. Appl. No. 10/677,084, Mar. 16, 2006, Office Action.
U.S. Appl. No. 10/677,084, Sep. 6, 2006, Office Action.
U.S. Appl. No. 10/677,084, Feb. 2, 2007, Notice of Allowance.
U.S. Appl. No. 11/053,186, Feb. 20, 2009, Office Action.
U.S. Appl. No. 10/996,558, Feb. 19, 2009, Office Action.
U.S. Appl. No. 10/996,558, Aug. 27, 2009, Notice of Allowance.
U.S. Appl. No. 11/112,456, May 12, 2009, Office Action.
U.S. Appl. No. 10/996,634, Nov. 5, 2008, Office Action.
U.S. Appl. No. 10/996,634, Mar. 30, 2009, Notice of Allowance.
U.S. Appl. No. 10/677,084, Nov. 1, 2006, Office Action.
U.S. Appl. No. 11/053,186, Sep. 2, 2009, Office Action.
U.S. Appl. No. 11/112,456, Nov. 30, 2009, Office Action.
U.S. Appl. No. 11/509,431, Feb. 22, 2010, Office Action.
U.S. Appl. No. 10/429,904, Mar. 24, 2010, Office Action.
U.S. Appl. No. 12/542,506, Apr. 29, 2010, Office Action.
U.S. Appl. No. 11/053,186, May 13, 2010, Notice of Allowance.
U.S. Appl. No. 10/429,904, Aug. 3, 2010, Notice of Allowance.
U.S. Appl. No. 11/509,437, Dec. 22, 2010, Notice of Allowance.
U.S. Appl. No. 11/559,821, Mar. 4, 2011, Office Action.
U.S. Appl. No. 12/563,026, Mar. 28, 2011, Office Action.
U.S. Appl. No. 12/431,597, Jun. 8, 2011, Office Action.
U.S. Appl. No. 11/559,821, Jul. 19, 2011, Office Action.
U.S. Appl. No. 12/563,026, Aug. 25, 2011, Office Action.
U.S. Appl. No. 12/563,041, Oct. 17, 2011, Office Action.
U.S. Appl. No. 12/431,597, Oct. 25, 2011, Notice of Allowance.
U.S. Appl. No. 11/559,821, Nov. 10, 2011, Office Action.
U.S. Appl. No. 12/563,026, Jan. 4, 2012, Notice of Allowance.
U.S. Appl. No. 12/563,041, Mar. 13, 2012, Office Action.
U.S. Appl. No. 11/559,821, Apr. 24, 2012, Notice of Allowance.
U.S. Appl. No. 13/445,221, Jul. 20, 2012, Office Action.
U.S. Appl. No. 12/370,579, Apr. 18, 2011, Office Action.
U.S. Appl. No. 12/370,579, Nov. 25, 2011, Office Action.
U.S. Appl. No. 10/445,395, Nov. 2, 2006, Office Action.
U.S. Appl. No. 10/445,395, Apr. 12, 2007, Office Action.
U.S. Appl. No. 10/445,395, Nov. 15, 2007, Office Action.
U.S. Appl. No. 10/445,395, Jun. 9, 2008, Office Action.
U.S. Appl. No. 10/445,395, Mar. 18, 2009, Office Action.
U.S. Appl. No. 10/445,395, Sep. 22, 2009, Office Action.
U.S. Appl. No. 13/612,134, Dec. 19, 2012, Office Action.
U.S. Appl. No. 13/612,134, Mar. 7, 2013, Office Action.
U.S. Appl. No. 13/612,134, Sep. 11, 2013, Office Action.
U.S. Appl. No. 13/612,134, Nov. 27, 2013, Notice of Allowance.
U.S. Appl. No. 13/445,221, Jan. 16, 2013, Notice of Allowance.
U.S. Appl. No. 12/563,041, May 14, 2013, Office Action.
U.S. Appl. No. 12/370,579, May 17, 2013, Office Action.
U.S. Appl. No. 12/370,588, May 17, 2013, Office Action.
U.S. Appl. No. 12/370,588, Aug. 26, 2013, Office Action.
U.S. Appl. No. 12/370,579, Sep. 16, 2013, Notice of Allowance.
U.S. Appl. No. 12/563,041, Sep. 18, 2013, Notice of Allowance.
U.S. Appl. No. 12/370,588, Dec. 19, 2013, Office Action.
U.S. Appl. No. 11/509,431, Dec. 24, 2009, Office Action.
U.S. Appl. No. 12/370,588, Nov. 21, 2011, Office Action.
U.S. Appl. No. 12/370,588, Jun. 13, 2011, Office Action.
Office Action Issued in European Patent Application No. 04012125.3, Mailed Date: Jul. 24, 2015, 4 Pages.
Office Action Issued in European Patent Application No. 15202590.4, Mailed Date: Mar. 30, 2016, 6 Pages.
Office Action dated Apr. 22, 2016 U.S. Appl. No. 14/158,602.

\* cited by examiner

ENHANCED TELEPHONY COMPUTER USER INTERFACE ALLOWING USER INTERACTION AND CONTROL OF A TELEPHONE USING A PERSONAL COMPUTER

CROSS-REFERENCE TO RELATED APPLICATIONS

This application is a continuation of U.S. patent application Ser. No. 13/612,134 filed on Sep. 12, 2012, entitled "ENHANCED TELEPHONY COMPUTER USER INTERFACE ALLOWING USER INTERACTION AND CONTROL OF A TELEPHONE USING A PERSONAL COMPUTER," which issued as U.S. Pat. No. 8,694,915 on Apr. 8, 2014, and which is a continuation of U.S. patent application Ser. No. 12/370,588, filed on Feb. 12, 2009, entitled "ENHANCED TELEPHONY COMPUTER USER INTERFACE ALLOWING USER INTERACTION AND CONTROL OF A TELEPHONE USING A PERSONAL COMPUTER," which is a divisional of U.S. patent application Ser. No. 10/445,395, filed on May 20, 2003, now abandoned. This case is also related to U.S. patent application Ser. No. 12/370,579 filed on Feb. 12, 2009, entitled "ENHANCED TELEPHONY COMPUTER USER INTERFACE ALLOWING USER INTERACTION AND CONTROL OF A TELEPHONE USING A PERSONAL COMPUTER", which is also a divisional of U.S. patent application Ser. No. 10/445,395.

The entirety of each of the foregoing applications is incorporated herein by reference.

TECHNICAL FIELD

This invention relates in general to integrated computer telephony and in particular to an enhanced telephony computer user interface that allows a user to control and manage a telephone from a personal computer while seamlessly integrating telephone and personal computer features to provide a rich user-controlled telephone management system and method.

BACKGROUND OF THE INVENTION

Personal computers and telephones are two indispensable devices in modern life. Personal computers (PCs) and telephones both provide the ability to communicate instantaneously with others virtually anywhere in the world. In addition, PCs have revolutionized modern society with their ability to process information and data and to provide a user interaction with this information and data. PCs also have the capability to control other devices. This capability, for example, allows a user to remotely control the peripheral device through a user interface, often graphical user interfaces. Even though the PC and telephone often exist in the same room, however, there currently exist few attempts to provide a useful integration of the two devices that takes full advantage of their strengths.

There have been many attempts at integrating the telephone with the personal computer, but with little market success. These failures are due to in part to problems with the product design including, for example, poor user interface design, the need for expensive additional hardware, and unrealistic user expectations. In addition, these products do not allow a user to access a telephone from a location different from the physical location of the telephone.

One product example is the Microsoft® Phone, which was included in Microsoft Windows® 95. Microsoft® Phone is a software-only speakerphone and answering machine that allowed a user to use their computer as a speakerphone. The Microsoft® Phone, however, required that the computer always be on (which was an unrealistic expectation in the Windows® 95 era) and was an expensive added feature to Windows® 95 because it required additional hardware. Moreover, the Microsoft® Phone has limited functionality.

Another product example that attempts to integrate the telephone with the personal computer is the IBM® Realphone. The IBM® Realphone is a telephone-dialing program that is modeled after a standard business telephone. The Realphone interface is a picture of the business telephone on the display. One problem, however, is that the advantageous synergies of the telephone and the computer are not merged. For example, the interface requires a user to use an input device (such as a mouse) to press the telephone keypad on the screen and dial a desired telephone number, as one would dial a real telephone. However, this type of interface is difficult, laborious and time-consuming for a user.

There has been more product success with integrating the telephone and the computer in the call center environment. For example, the call center environment (such as customer support and telemarketing centers) often includes software applications that provide telephone information such as a phone queue display (the order of callers in a queue), a display of how many calls are waiting, and the ability to route calls to representatives. These software applications are designed for the customer service audience, however, and there is little or no attempt to meet the need of the private user or provide a user-friendly integration of the physical telephone and the software interface. For the call center audience, a priority is to increasing call throughput and quickly assigning calls in the queue, while the user experience is not. Moreover, telephony applications for the call center environment lack functionality and control features needed by an end-user that are critical for a high-quality user experience.

Therefore, there exists a need for a user interface allowing a user to seamlessly interact with a telephone using a personal computer. The user interface needed should provide a user with a rich variety of functionality and take advantage of the processing power of the computer to enhance a telephone's capabilities. Moreover, the user interface needed should provide a tight coupling between the personal computer and the telephone such that a user is unaware of any division between the two.

SUMMARY OF THE INVENTION

The invention disclosed herein includes a computer user interface that integrates features of a personal computer (PC) and a telephone into a coherent enhanced telephony (ET) user interface. The ET user interface resides on a personal computer and facilitates user control of all telephone functions using the processing power of a personal computer. More than this, however, the ET user interface includes features that are only made possible by the use of a PC merged into a telecommunications environment.

The ET user interface overcomes problems with prior attempts to integrate the PC and the telephone. Specifically, the user is provided with a rich variety of functionality that leverages the fact that the PC has considerably more processing power and greater access to variety of data than the ordinary telephone. This processing power and data access is used to the user's advantage as the telephone's capabilities and functionality are greatly expanded. Moreover, the ET user interface provides a tight coupling between the personal computer and the telephone such that a user is unaware of any division between the two. This seamless integration, along with enhanced functionality, greatly simplifies and improves the user experience.

The user can be at a different physical location from the telephone and still be able to control the telephone using the ET user interface. The only requirement is that the ET user interface and the telephone be network connected. Thus, the user, as long as he has access to the network, can control the telephone from virtually anywhere.

The ET user interface is designed to operate in both a telecommunications and computer environment, either in an enterprise or home setting. For example, in the typical enterprise setting, the enterprise owns the telephone equipment tied to the public telephone lines and employees have access to a corporate computer network. In another example, in the typical home setting the user has calendar and address book data on his PC and has access to a public telephone network.

The ET user interface is designed to control and manage a single telephone or multiple telephones, including cellular phones, cordless phones, and desk phone. Moreover, these phones can be located at different locations, such as a mobile phone, a home phone and a work phone. The ET user interface also allows the telephone to be used as an intercom and to provide wakeup calls and meeting reminders.

In general, the ET user interface includes a plurality of environments for the user to choose. These environments include a My Contacts environment, a communication preferences environment, and a Call History environment. Each of these environments contains certain available processes and features for controlling and managing telephones. The processes include actions and collaborations relevant to a contact, a telephone, or both. The features and processes are integrated with databases linked to the interface such that information about contacts (such as persons and entities) can be obtained from multiple sources and merged into a single accessible entry.

The ET user interface includes an environment region, a process region, and an activity region. In addition, the interface includes a call status region that keeps a user informed as to a status of controlled telephones. The My Contacts environment includes processes that allow the user to initiate, terminate and control both incoming and outgoing calls from the PC with a minimum of effort. A favorites feature give the user access to his most popular persons to call, based on a popularity criteria. A search feature allows a user to search linked databases (such as, for example, corporate and personal address books) for desired information. In addition, the search can be limited to a specific database, such as from the Outlook application running on the PC.

The My Contacts environment includes features to enhance placing a call. In particular, when a call is placed the user receives both visual and audio cues that keep the user informed of the progress of the call. Once in the call, a call window appears containing detailed information about the person at the other end of the line and links to previous information associated with that person. For example, any documents opened during previous conversations with the person or e-mails received from him are listed in the call window such that the user can retrieve them by clicking. An advanced call camp feature allows the ET user interface to notify the user when a person becomes available if the person was previously unavailable (such as when the person's line was initially busy). Moreover, the advanced call camp feature can be integrated with the person's calendar to provide the user with the best time to call the person.

The My Contacts environment includes call transfer and conference calling processes. The user can initiate a conference call while in a telephone conversation by merely clicking a button in the interface. Visual and audio cues, from both the PC and the telephone, are used to keep the user informed as to the progress of the establishment of the conference call. In addition, a synthetic voice can be used to automatically inform persons being called for the conference call to stand by until all persons have joined the call.

The user is notified of incoming calls both visually and audibly. In visual terms, an incoming call notification window appears on the user's desktop to signal an incoming call. If the telephone system includes caller identification, the caller's telephone number can be matched to detailed information about the caller from the linked databases. This information then is displayed in the window. The window can also include the calendar of the caller, so that the user can better decide whether to answer the call. In audio terms, rich ring tones available from sound files played on the PC can signal an incoming call. These sound files can be caller-specific, such that the user can identify from the ring tone who is calling. The incoming call notification window also includes a quick transfer button. This button enables the user to transfer an incoming call to the user's present location, such as the user's cell phone, when the user is away from the telephone being called.

Another incoming call feature is an unknown contact conversion feature. This feature converts unknown contacts into known contacts using a variety of sources. Thus, if an incoming call is received from an unknown caller (one who is not in the linked databases), then ET user interface obtains and provides as much information as it can find about the unknown caller in an attempt to determine the identity of the caller. By way of example, the unknown contact conversion feature can obtain the unknown caller's geographic location based on the area code of the caller. As another example, the feature can access public Internet sites to perform a search to find online the person associated with the telephone number. Alternatively, the user can provide a name for the unknown caller. Once the unknown caller's identity is determined, the information is saved in the linked databases such that the next time the caller calls his identity will be known.

Another feature of the My Contacts environment is a call forwarding feature that forwards incoming calls to other telephones under certain conditions. These conditions can be specified by the user. In the event that an incoming call is missed and the caller does not leave voice mail, the ET user interface can notify the user (such as by an e-mail notification) that the call has been missed. The missed call e-mail notification can also contain detailed information about the caller, including the caller's calendar so that the user can determine the best time to reach the caller.

While in a call, several features enable the user to have a richer user experience with the telephone and PC combination. A screen sharing feature allows the user to share the contents of the user's computer screen with a caller. A PC audio feature adjusts parameters on the PC based on telephone usage. For example, if the user is listening to a sound file on the PC and receives an incoming call, the sound on the PC is automatically muted or slowly lowered and the sound file is paused. Upon termination of the call, the parameters are returned to their previous settings.

A notes feature allows a user to create call notes while in a call. The notes can have headers intelligently created to aid in indexing, searching and later lookup. The headers contain information about the notes and the call, such as the call time, subject, and parties involved in the call. The headers can be call-centric, which means they are associated with a specific call, or person-specific, which means they are associated with a particular person. Headers can be created by integrating information from the linked databases to the notes. For example, calendar information can be used to determine the purpose of the call, and based on this information headers generated for notes created during that time period.

The My Call History environment provides the user with access to a history of call activity. Items such as incoming call logs, outgoing call logs, missed calls, and so forth, can be recorded in the call history. From this information, the call history environment can provide a statistical summary of call usage. Moreover, the ET user interface provides the user with the capability to dial directly a telephone number in the call history list or statistical summary.

The communication preferences environment provides a user with a way to notify others of the user's contact preferences. Thus, if a user prefers to be contacted by e-mail, this information can be contained within the contact information for the user or relayed to others by means of a icon. In addition, the communication preferences environment allows a user to create groups containing persons or entities and assign group-specific rules. For example, these rules can be rules for call forwarding and assigning a specific ring tone to the group. Further, the rules can be based on the calendar of each of the group members. The ET user interface also provides the user with the ability to obtain and change settings remotely. For example, the user could be notified by e-mail of the current settings for the ET user interface and then change these settings by sending a return e-mail containing the new settings.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

Despite the importance of the telephone and personal computer in most people's everyday lives, the two remain largely disconnected from each other. Although certain specialized applications exist that link the two devices for use in areas such as telemarketing and customer service centers, the application for personal use has remained essentially ignored. The enhanced telephony (ET) user interface telephone brings computer-telephony to the personal computer desktop to provide a user with a rich interactive experience that integrates computer and telephony features for general use.

II. Enhanced Telephony (ET) User Interface Environment

The ET user interface is designed to operate in a combined telecommunications and computer environment. In particular, the ET user interface resides on a computing device. Using the peripheral devices of the computing device, a user is able to obtain visual and audio information from the ET user interface about telephones in communication with the computing device. By way of example and not limitation, a peripheral devices such as a display device and speakers may be connected to the computing device such that the ET user interface informs the user about the telephones in an audible manner (via the speakers) and in a visual manner (via the display device).

Figure 1:
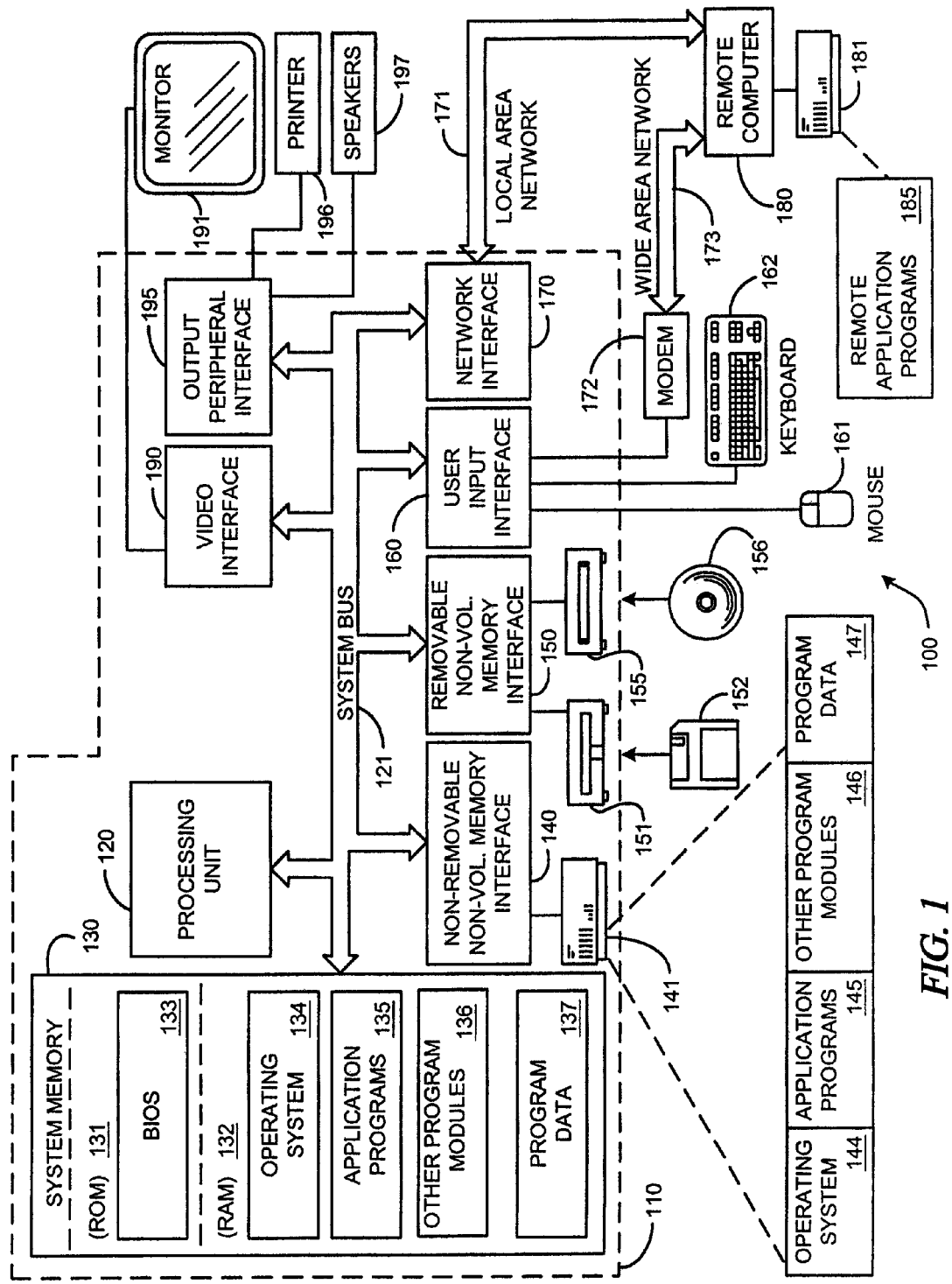
FIG. 1 illustrates an example of a suitable computing system environment 200 in which the enhanced telephony (ET) user interface may reside.

The following discussion is intended to provide a brief, general description of a suitable computing environment in which the ET user interface may be implemented. FIG. 1 illustrates an example of a suitable computing system environment 100 in which the ET user interface may reside. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The ET user interface is operational with numerous other general purpose or special purpose computing system environments or configurations. Examples of well known computing systems, environments, and/or configurations that may be suitable for use with the ET user interface include, but are not limited to, personal computers, server computers, hand-held, laptop or mobile computer or communications devices such as cell phones, PDAs, merged cell phones and PDAs, multiprocessor systems, microprocessor-based systems, set top boxes, programmable consumer electronics, network PCs, minicomputers, mainframe computers, distributed computing environments that include any of the above systems or devices, and the like.

The ET user interface may be described in the general context of computer-executable instructions, such as program modules, being executed by a computer. Generally, program modules include routines, programs, objects, components, data structures, etc., that perform particular tasks or implement particular abstract data types. The ET user interface may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the ET user interface includes a general-purpose computing device in the form of a computer 110.

Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within the computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 120 through a user input interface 160 that is coupled to the system bus 121, but may be connected by other interface and bus structures, such as, for example, a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2A:
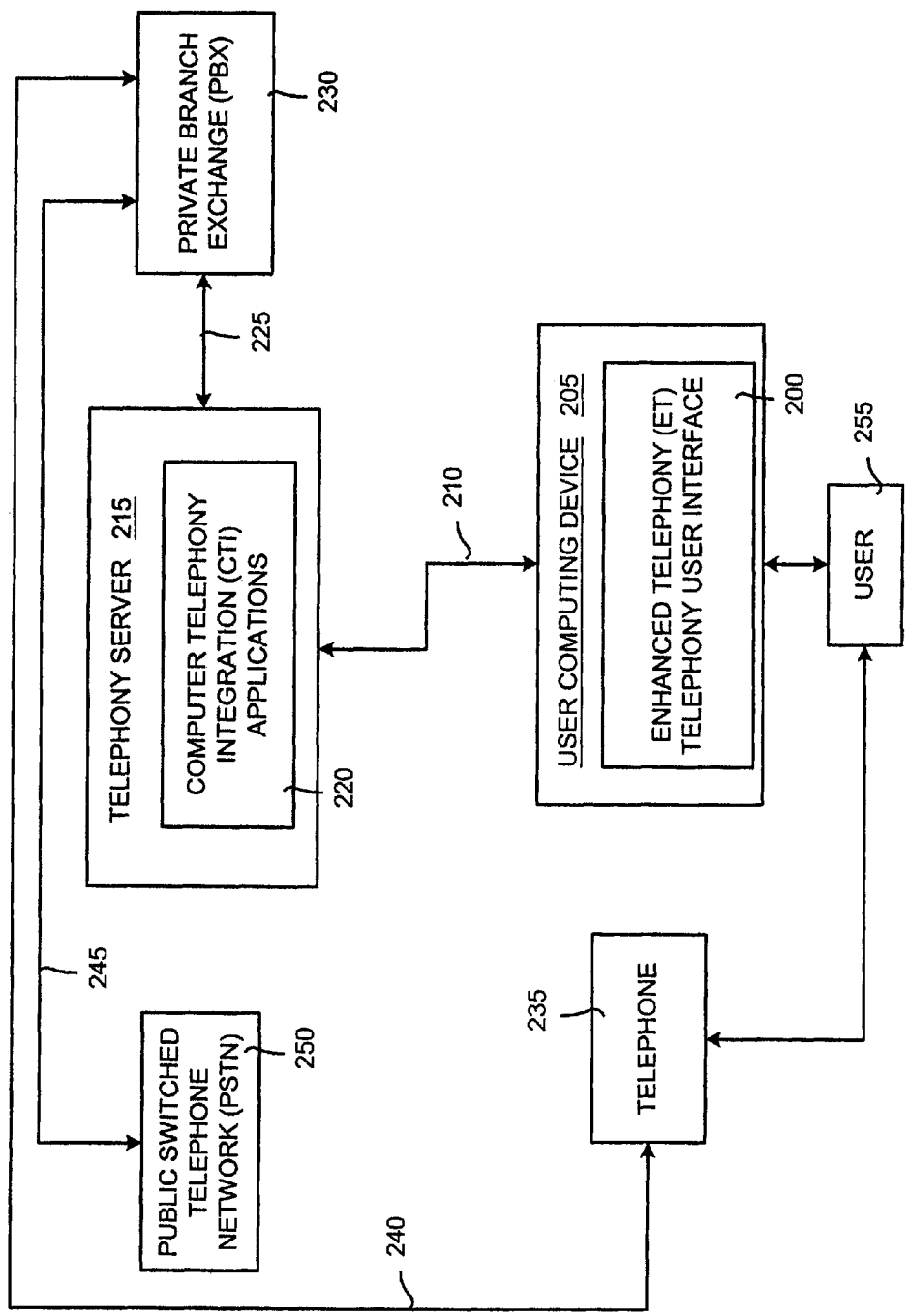
FIG. 2A illustrates a first implementation of the ET user interface incorporated into the computing and telephone environments where a telephone is not connected directly to a computing device.

The ET user interface also is designed to operate in a telecommunications environment. FIGS. 2A and B are general block diagrams illustrating two possible implementations of the computing and telephone environments. FIG. 2A illustrates a first implementation of the ET user interface incorporated into the computing and telephone environments where a telephone is not connected directly to a computing device.

In this first implementation, the ET user interface 200 resides on a user computing device 205. It should be noted that the computer 110 in FIG. 1 is an example of the user computing device 205. This user computing device 205 may be any computing device capable of running and displaying the ET user interface, such as a PDA, notebook computer, or desktop computer. The user computing device 205 is connected 210 to a network via a telephony server 215. Once again, the computer 110 in FIG. 1 is an example of the telephony server 215.

Residing on the telephony server 215 are Computer-Telephone Integration (CTI) applications 220. CTI applications 220 are system that provide control of telephones and receive information about their use. In other words, the CTI applications 220 provide the ability to control a telephone and the awareness of what the telephone is doing (such as knowing when the telephone rings). In this first implementation, the CTI applications 220 reside on the telephony server 215, while in a second implementation (described below) the CTI applications 220 reside on the user computing device 205.

The telephony server 215 is connected 225 to a private branch exchange (PBX) 230, typically belonging to an enterprise such as a corporation. The PBX 230, which usually is located on a company's premises, provides a connection between a telephone 235 and public telephone lines. The PBX 230 may also be a central office exchange service (centrex), a type of PBX where switching occurs at a local telephone station instead of at the company premises. In this first implementation, the telephone 235 is not directly connected to the user computing device 205. Instead, the telephone 235 is connected into the PBX 230 via a connection 240. The PBX 230 is connected 245 to a certain number of outside lines on a public switched telephone network (PSTN) 250. A user 255, through the ET user interface 200, interacts with the telephone 235 and the user computing device 205.

Figure 2B:
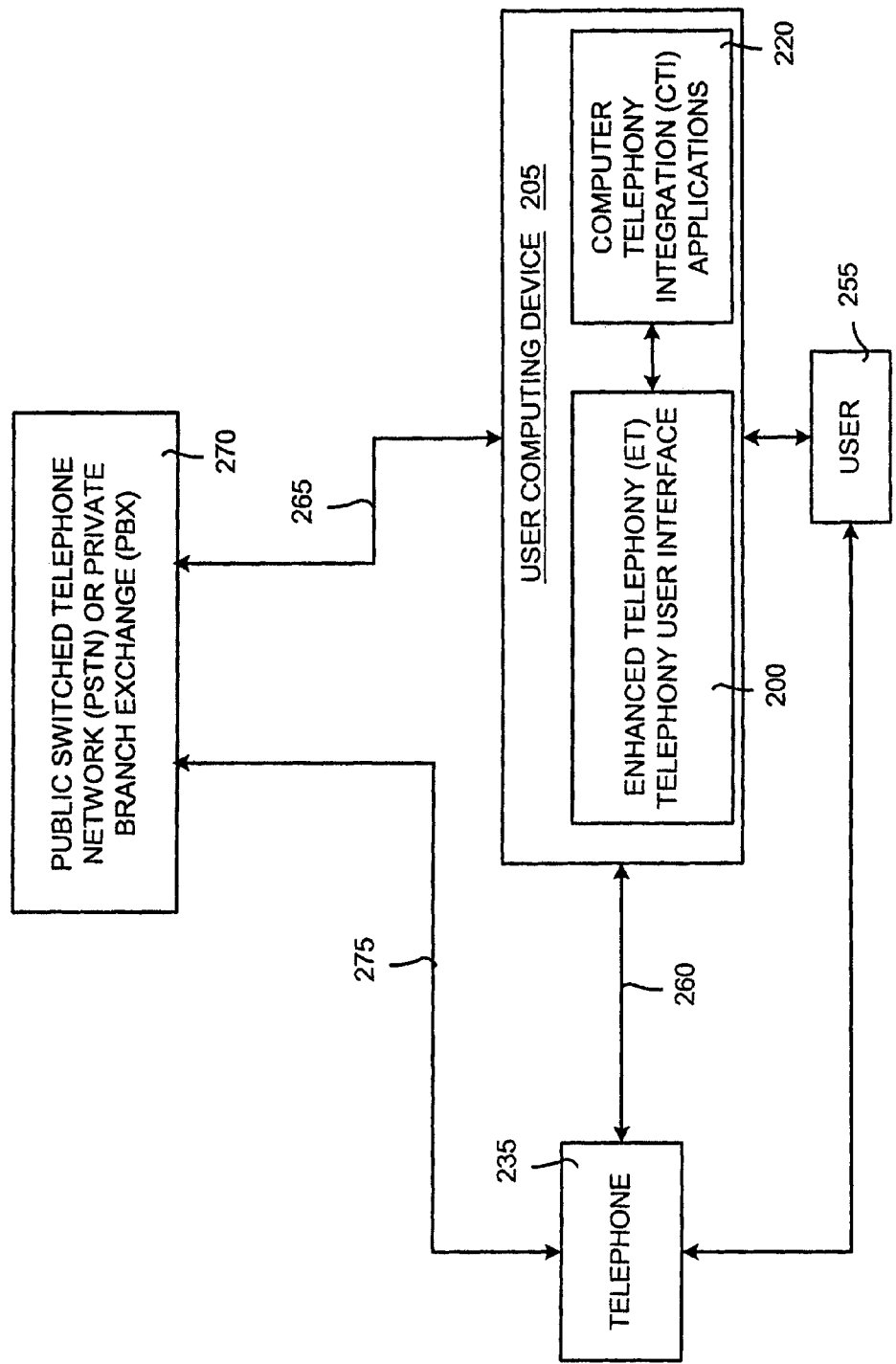
FIG. 2B illustrates a second implementation of the ET user interface incorporated into the computing and telephone environments where the telephone and the computing device are connected.

FIG. 2B illustrates a second implementation of the ET user interface incorporated into the computing and telephone environments where the telephone and the computing device are connected. In this second implementation, the telephone 235 is directly connected to the user computing device 205 via a wireless or cable connection 260. The CTI applications 220 reside on the user computing device 205 instead of the telephony server 215. The user computing device 205 is either connected 265 to a PSTN (as in a home setting) or connected to a PBX (as in an enterprise setting) 270. Moreover, the telephone is also connected 270 to either the PSTN or the PBX 270. In both implementations shown in FIGS. 2A and B, the user can use a second computing device (not shown) to remotely connect to the user computing device 205 that is co-located with the telephone 235. Then, user can access the ET user interface 200 from the second computing device to transfer incoming calls to another telephone (such as a cell phone) at the user's location.

The ET user interface 200 obtains information from a variety of sources. This information then is disseminated to the user 255 using peripheral devices connect to the user computing device 205 (personal computer, or PC for short). For example, visual information is displayed on a display device and audio information is relayed through speakers or headphones. In addition, the ET user interface 200 allows a user to interact with the information through input devices connected to the PC, such as a keyboard and a mouse. In addition, the telephone 235 itself is an input device, because the ET user interface 200 uses the CTI applications 220 for awareness of the user's 255 interaction with the telephone 235.

Figure 3:
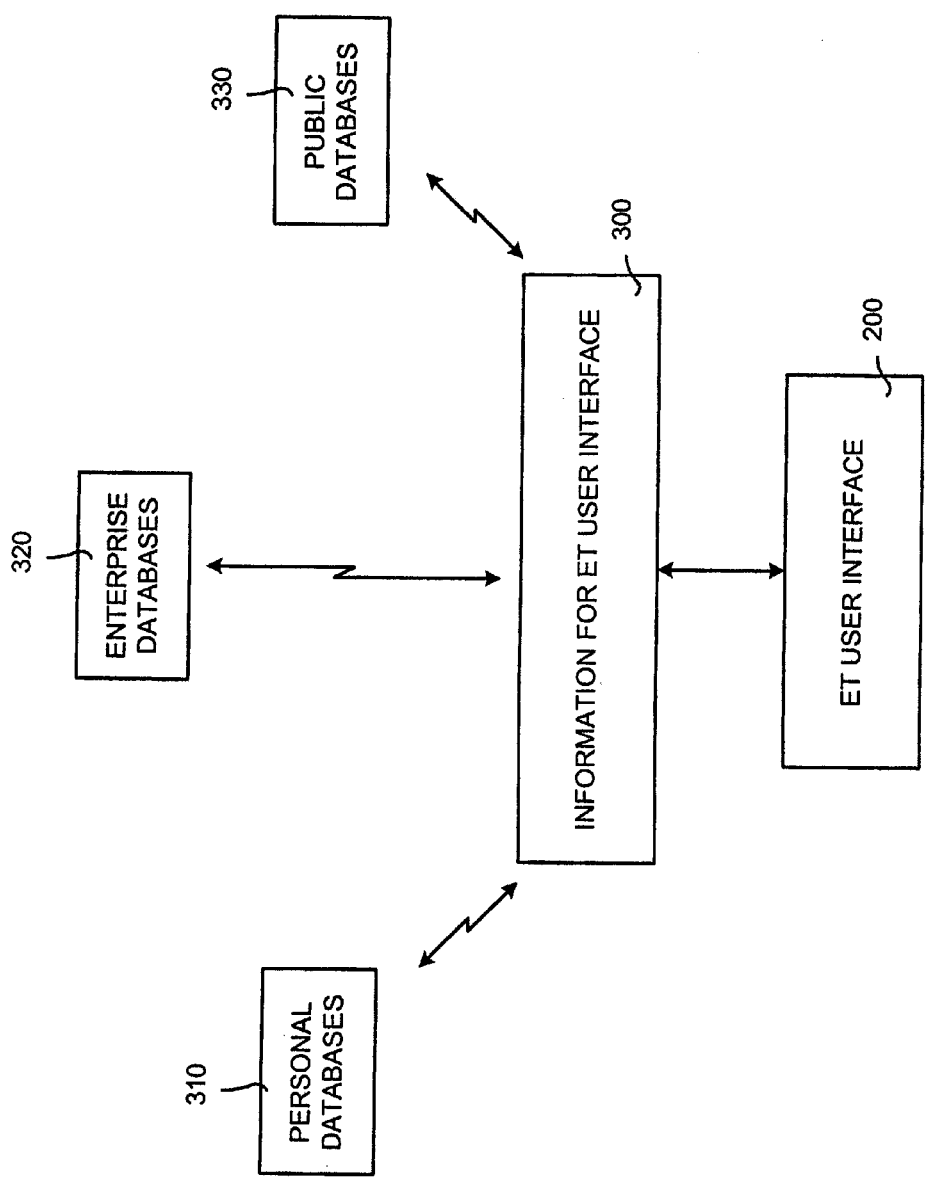
FIG. 3 is a general block diagram illustrating the different sources of information for the ET user interface shown in FIGS. 2A and B.

FIG. 3 is a general block diagram illustrating the different sources of information for the ET user interface 200. In general, the ET user interface 200 receives information 300 from a variety of possible sources. These sources include personal databases 310, enterprise databases 320, and public databases 330. The personal databases 310 include application-specific databases (such as e-mail, Outlook, instant messenger, and calendar databases), the enterprise databases 320 include the hierarchy of the corporation, corporate addresses, calendar database, and picture databases, and the public databases 330 include public Internet sites and online telephone books. Depending on the nature of its contents, a database may reside on either the telephony server 215, the user computing device 205, or both. For example, personal address books and calendar information (from the personal databases 310) may reside on the user computing device 205 (such as a user's personal computer), while the corporate hierarchy (from the enterprise databases 320) may reside on the telephony server 215. The information 300 available to the ET user interface will be discussed in detail below in the context of features of the invention.

The ET user interface 200 can derive contact information from the various sources mentioned above and merge them into a single contact. For example, contact information from the enterprise databases 320, the personal databases 310 (such as an address book), and the public databases 330 can yield multiple telephone numbers and other contact information for a single contact. This means that several contact entries exist, even though each entry may be the same person or entity. The contact information integration feature incorporates alleviates duplication and merges all of contact information and entries into a single contact entry for display in the ET user interface 200.

In some cases a question may arise as to whether multiple contacts are one in the same person or entity. For example, a contact may be in the corporate databases 320 under his full name but be listed in a user's Outlook address book (from the personal databases 310) under his nickname. In these cases, the user typically is queried as to whether the contact found is the same person desired and whether the user wants to overwrite a new phone number found (such as a new home phone number for a person when his old number is in one of the databases).

III. Enhanced Telephony (ET) User Interface Layout

The ET user interface 200 contains several key aspects that provide a user with a rich user telephony experience. Some of these key aspects include the ability to initiate a call in the ET user interface 200 (click to call) from virtually anywhere a contact name or telephone number appears. Anywhere a contact name (assuming the name can be associated with a telephone number in the linked databases) or telephone number appears in the ET user interface 200, the user merely clicks on the contact name or number to initiate a telephone call. This greatly reduces the number of mouse clicks or keyboard strokes required to place a call. Moreover, this click-to-call capability is not limited to calling a telephone, but can also be expanded to other means of contacting a person, such as e-mail and instant messenger.

Another key aspect of the ET user interface 200 is the merging of calendar information (such as from a user's personal calendar) and the user's presence status. In general, the presence status is any information that helps in understanding the user's location at any given time, what the user is doing, and how a person can contact the user. By way of example, for a person, presence information includes a person's calendar, their instant messenger status, applications that are currently open on their computer screen, the time since the person last moved the mouse or touched the keyboard, their current physical location, whether they have their cell phone turned on, whether their desk phone is busy, and how many people are in their office. All or some of this presence information can be displayed in the ET user interface 200. Thus, based on calendar information, a presence status of the user is made available to others such that others are aware of the best time and the best (or preferred) means of contacting the user. Other key aspects of the ET user interface 200 include the unique call notification features available when the user misses an incoming call, and the unique call routing features that intelligently route an incoming call based on a user's input or integrated calendar information.

The key aspects, processes and features of the ET user interface 200 may be implemented in a variety of ways. Moreover, the appearance of the interface 200 may vary drastically between implementations. For example, the arrangement of different regions may be different, the number of tabs in each regions may vary, and even the names of the environments, features and process may differ. However, it should be understood that even though the appearance of the interface 200 may differ between implementations, the key aspects, processes and features described herein are still within the scope of the invention described herein.

A general description of the layout of the ET user interface 200 will now be discussed. This is the layout that a user sees and interacts with when running the ET user interface 200 on a computing device. It should be noted that this is one implementation of the ET user interface 200, and several other layouts are possible. In general, the ET user interface 200 is divided into regions. These regions will be discussed with reference to FIG. 4. Subsequent sections of this paper then will provide a more detailed description of each of the features that may be included in each region.

Figure 4:
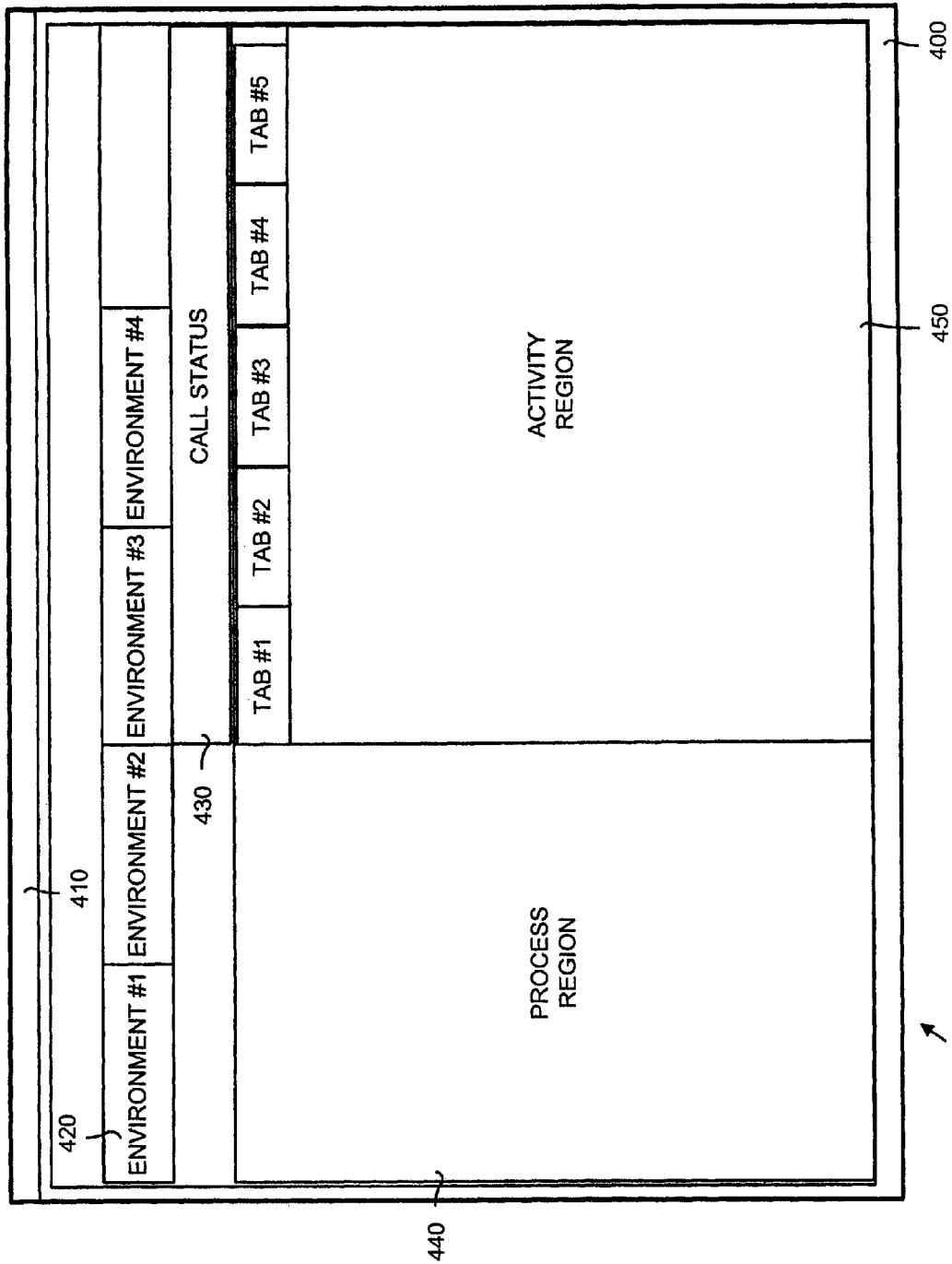
FIG. 4 illustrates a general overview of the ET user interface shown in FIGS. 2A, 2B and 3.

FIG. 4 illustrates a general overview of the ET user interface 200 shown in FIGS. 2A, 2B and 3. In general, a information 300 is displayed to a user through the ET user interface 200 and functionality is provide such that the user can interact with the information 300. Specifically, the ET user interface 200 includes a main window 400 that is a standard Microsoft® Windows® window containing a title bar 410. Below the title bar 410 is an environment region 420 containing buttons for selecting any number of environments. It should be noted that although four environment buttons are shown, more or less may be included in the environment region 420. By selecting one of the environment buttons, the user causes the ET user interface 200 to display certain features, as described below.

Below the environment region 420 is a call status region 430. The call status region 430 provides information about a status of each telephone in communication with the ET user interface 200. For example, if the user in not in a call, the call status region 430 displays a message that states "Not in a Call". A process region 440 also is include in the ET user interface 200. The process region 440 displays the available processes and allows user selection of those processes. Next to the process region 440 is located an activity region 450. The activity region 450 displays feature tabs 460 that correspond to features available in the environment selected by the user. The processes and features are discussed in detail below.

IV. Feature and Process Details of the ET User Interface

The details of the features and processes associated with the ET user interface 200 will now be discussed with respect to each of the environments.

"My Contacts" Environment

Figure 5:
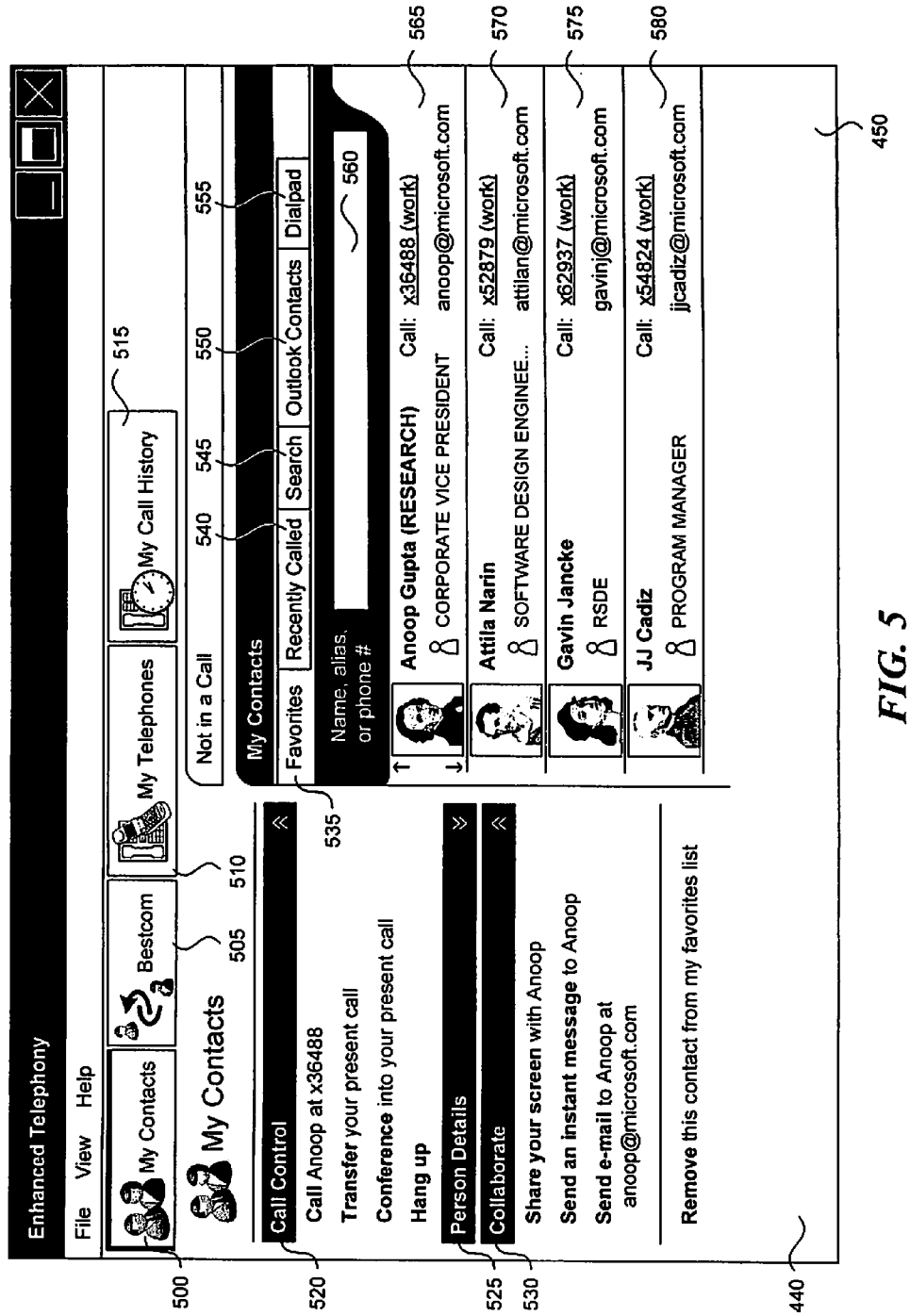
FIG. 5 illustrates the My Contacts environment of the ET user interface.

The My Contacts environment provides a user with an interactive means to manage calls and contacts. This includes incoming calls, outgoing calls, and provides control and management feature while in a call. FIG. 5 illustrates the My Contacts environment of the ET user interface. As can be seen in FIG. 5, the user has clicked on the My Contact environment button 500 to display this environment. The other environments also are shown, namely, the "Bestcom" environment 505, the "My Telephones" environment 510, and the "My Call History" environment 515.

The My Contacts environment 500 includes three main processes in the process region 440. The Call Control process 520 provides a user with the initiate, terminate, and control both incoming and outgoing calls from the PC. The Person Details process 525 allows the user to obtain detailed information about a contact. As explained in detail below, this information may be obtained from a variety of sources and integrated into a single contact entry. The Collaborate process 530 provides the user with various ways to get in touch with a contact, including e-mail and instant messaging (IM). In addition, the Collaborate process 530 allows the user to access the screen sharing feature, where the user can share his screen with the caller.

The My Contacts environment 500 also includes five features tabs in the activity region 450. Namely, the Favorites tab 535, the Recently Called tab 540, the Search tab 545, the Outlook Contacts tab 550, and the Dialpad tab 555. The activity region 450 also includes a search box 560 that uses the search feature 545 to search for a contact. It should be noted that a variety of other tabs are possible, and tabs may be added or deleted according to a user's preferences or corporate policy. As shown in FIG. 5, the Favorites tab 535 has been clicked, so that the activity region 450 also display entries 565, 570, 575, 580 of favorite contacts. Note that each entry 565, 570, 575, 580 contains a variety of information about the contact. A key feature of the ET user interface 200 is that rich information is available for person or entity associated with a telephone number. In other words, more than just a list of telephone numbers is shown for each entry 565, 570, 575, 580.

Contact Information

Referring to FIG. 5, in the activity region 450 is shown a list of favorite telephone numbers of the user. Note that each entry 565, 570, 575, 580 can have an associated picture (if available), name, title, telephone number, and office location. The picture may be obtained from the corporate database, the user may specify the picture, or the contact can supply the picture. It should be noted that although a photograph is shown in FIG. 5, the picture may be any of graphic or textual material. For example, if the contact is an entity (such as a department of the corporation), the picture may display the department logo. The contact information also includes other means of reaching the contact, such as a home and cellular telephone number and an e-mail address.

The contact information may also contain a presence status in addition to or in place of a picture. The presence status is any type of indicator that communicates to the user a status of the contact. For example, the presence status indicator may be a "happy face" graphic that is shown in color when the contact is connected to the corporate network or sitting at her computer but is grayed-out when she is not connected or away from her computer. Similar to instant messaging (IM) services, the presence status provides the user with additional information about the contact. If the user is on the telephone, the ET user interface 200 knows this and sets the user's presence status to "on the phone". The ET user interface allows combined PC/IM user experience by using presence status and by providing IM contact information.

The presence status can have different levels depending on the relationship between the user and the contact. For example, if the contact is the user's supervisor, then richer presence information may be available to the user than would otherwise be available to others in the company. These levels may be set either explicitly by the user and the contact, or implicitly based on corporate policies.

Contact information may also include access to the contact's calendar. Of course, the contact would first have to provide consent to make his calendar available, either to everyone or to specific individuals of his choosing. The contact's calendar is loaded into the ET user interface 200 such that the user can determine the contact's location at a specific time or day. By way of example, assume that the user is trying to call a contact. By bringing up the contact in the ET user interface 200 and viewing his calendar, the user can determine when the contact is available and the best time to call.

The calendar feature can also be linked to the presence status to provide additional information about the contact. For example, if the presence status indicator communicates that the contact is away from her computer, the user can consult the contact's calendar and determine whether the contact is scheduled to be in a meeting or on the telephone.

The contact information includes a map feature that provides a map to the contact's office location. The map may be accessed through a link to the corporate database or an Internet connection. Through the ET user interface 200, the user is able to enter his location and have the map feature provide directions to the contact's office. These direction may be graphical, textual, or both, depending on the user's preference.

Outgoing Call Features

As shown in FIG. 5, the tabs in the activity region include a "Favorites" tab 535, a "Recently Called" tab 540, a "Search" tab 545, an "Outlook Contacts" tab 550, and a "Dialpad" tab 555. It should be noted that other tabs are possible, and these tabs are only exemplary examples used in this implementation. Each of these tabs will now be discussed in the context of a user performing outgoing calling.

"Favorites" Tab

The Favorites feature tab 535 is used to access a favorites list tailored specifically for a user. When the user clicks the Favorites tab 535, the favorites list (or a portion therefore) is shown in the activity region 450 of the ET user interface 200. In general, the favorites list is a list of the user's favorite or most popular telephone numbers to call. The favorites list allows a user to quickly and easily call frequently-called contacts (similar to an enhanced speed dial). The popularity of the telephone number can be based on a number of criteria. By way of example, the criteria may include the user's calling frequency of the telephone number, how recently a number was called, a relationship between owner of the telephone number and the user (such as higher popularity to a user's boss and spouse), and a user's explicit instructions. Based on this popularity criteria, the user or the system can add or remove telephone numbers from the favorites list.

The favorites list can be generated or populated in a number of ways, both automatically and manually. For example, the user can manually construct his favorites list from his personal databases 310, from the enterprise databases 320, from the public databases 330, or all of the above. The favorites list may populated with the other persons in the user's department, group or team along with the user's supervisors to whom he reports. The user can add still more favorites as he desires.

The favorites list may also be populated automatically. This automatic population of the favorites list can be performed by an analysis of virtually any database to which the user has access. For example, the favorites list may be populated using the user's e-mail database. In this situation, the ET user interface 200 obtains data about who the user sends e-mails to, receives e-mails from, or both and constructs a list. The top n numbers on the list then are used to populate the favorites list. The number n may be selected by the user (through the ET user interface) or selected automatically. As another example, the ET user interface 200 can have access to a list of calls recently made the user. Once again, the top n numbers can be used to populate the favorites list. It should be noted that the favorites list can be populated from a single list or database or multiple lists or databases.

Another type of automatic population (or pre-population) occurs at startup. At startup, the user typically will not have a list of favorites and will need to populate the favorites list. The ET user interface 200 includes an automatic customization feature that helps a user add telephone numbers to the favorites list. As described above, this automatic customization feature at startup initially populates the favorites list by an analysis of a database containing telephone numbers, explicit user input, or both. By way of example, in the enterprise setting the favorites list may be pre-populated at start up based on the corporate organizational structure available from the enterprise databases 320. For example, the user's favorites list may include members of his department including his immediate supervisor. Once the favorites list has been populated using the automatic customization feature, the favorites list can be revised and changed either automatically or manually as desired, as described above.

"Recently Called" Tab

A Recently Called feature tab 540 also is included in the ET user interface 200. This tab 540 allows a user to access a list of recently-called telephone numbers made by the user. The top n recently called telephone numbers can be used to populate the recently called list. It should be noted that the recently called list can be populated from a single list or multiple lists.

"Search" Tab

The ET user interface 200 includes a search feature tab 545 that provides a user with a rich searching experience. By clicking the search tab 545, the user can interact with a powerful search feature displayed by the ET user interface 200 that gives the user the capability to search all linked lists and databases. The search feature allows searching based on a number of different criteria (such as first name, last name, nickname, phone number, alias, building, department, office number, etc.). The search feature can perform the search within any of the linked lists or databases, the computing device running ET user interface 200 (such as a client), or on a backend server (such as the telephony server 215).

Figure 6:
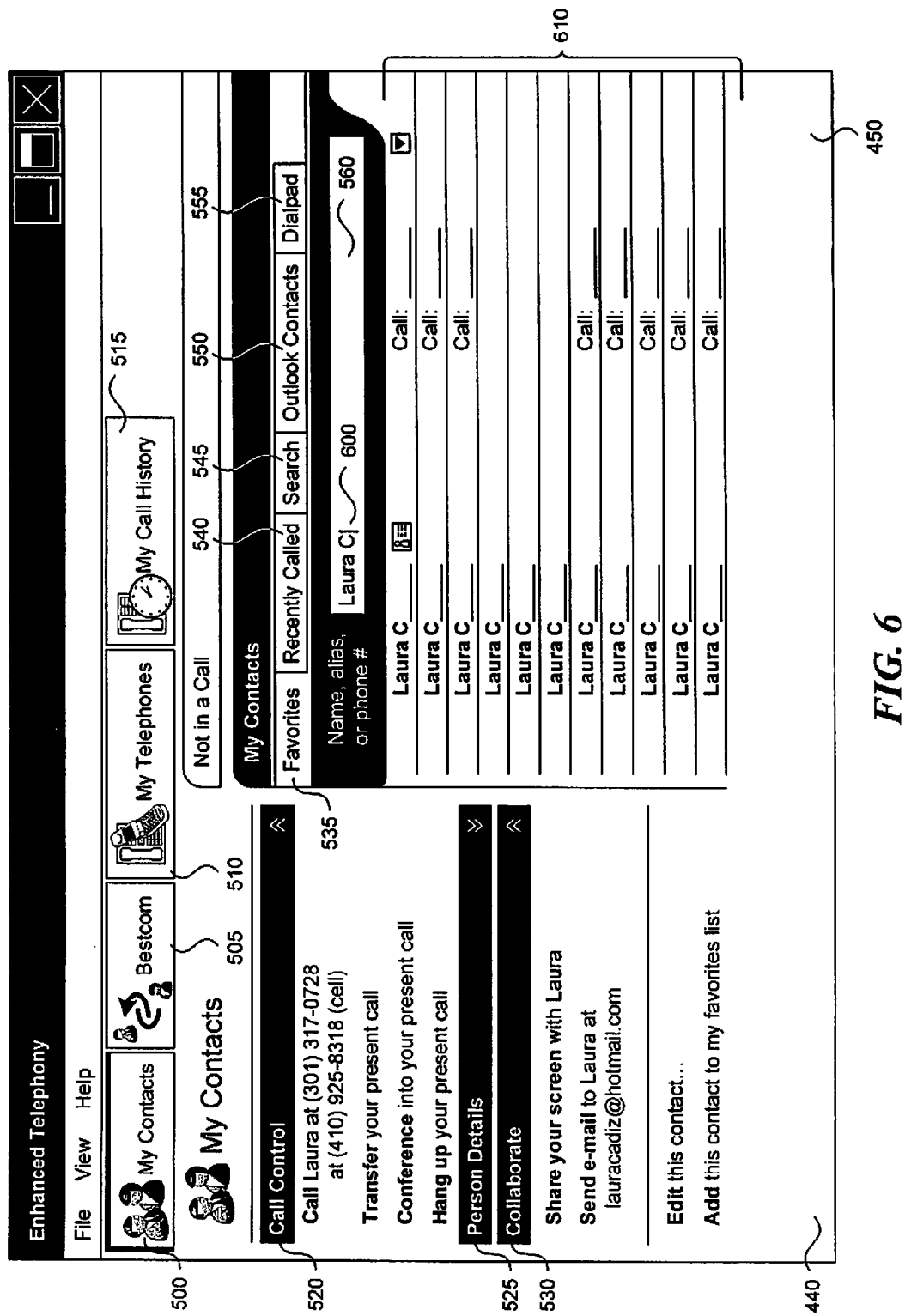
FIG. 6 illustrates the search feature tab contained in the My Contacts environment shown in FIG. 5.

FIG. 6 illustrates the search feature tab 535 contained in the My Contacts environment 500 shown in FIG. 5. In particular, in FIG. 6 the user has clicked on the search feature tab 535 and entered a search query 600 into the search box 560. Based on the query 600, the search feature has returned several possible matches 610, with the highest probable match being displayed first and the other displayed in descending order. These possible matches 610 were obtained by searching each all of the information 300 available to the ET user interface 200. The search feature also includes visual cues that inform the user which databases are being searched. For example, icons representing the available databases can be used to inform the user which database results were found. These results then are displayed with accompanying icons representing the databases where the results were found.

"Outlook Contacts" Tab

The "Outlook Contacts" tab 550 is a feature of the ET user interface 200 that integrates all contacts contained in Microsoft® Outlook. The Outlook contacts feature is useful if the user interacts mainly with persons outside the company rather than inside the company. In this case, the user frequently accesses his Outlook databases (within the personal databases 310) rather than the enterprise databases 320. Multiple telephone numbers from Outlook are shown in a pull-down menu within the ET user interface 200.

"Dialpad" Tab

Figure 7:
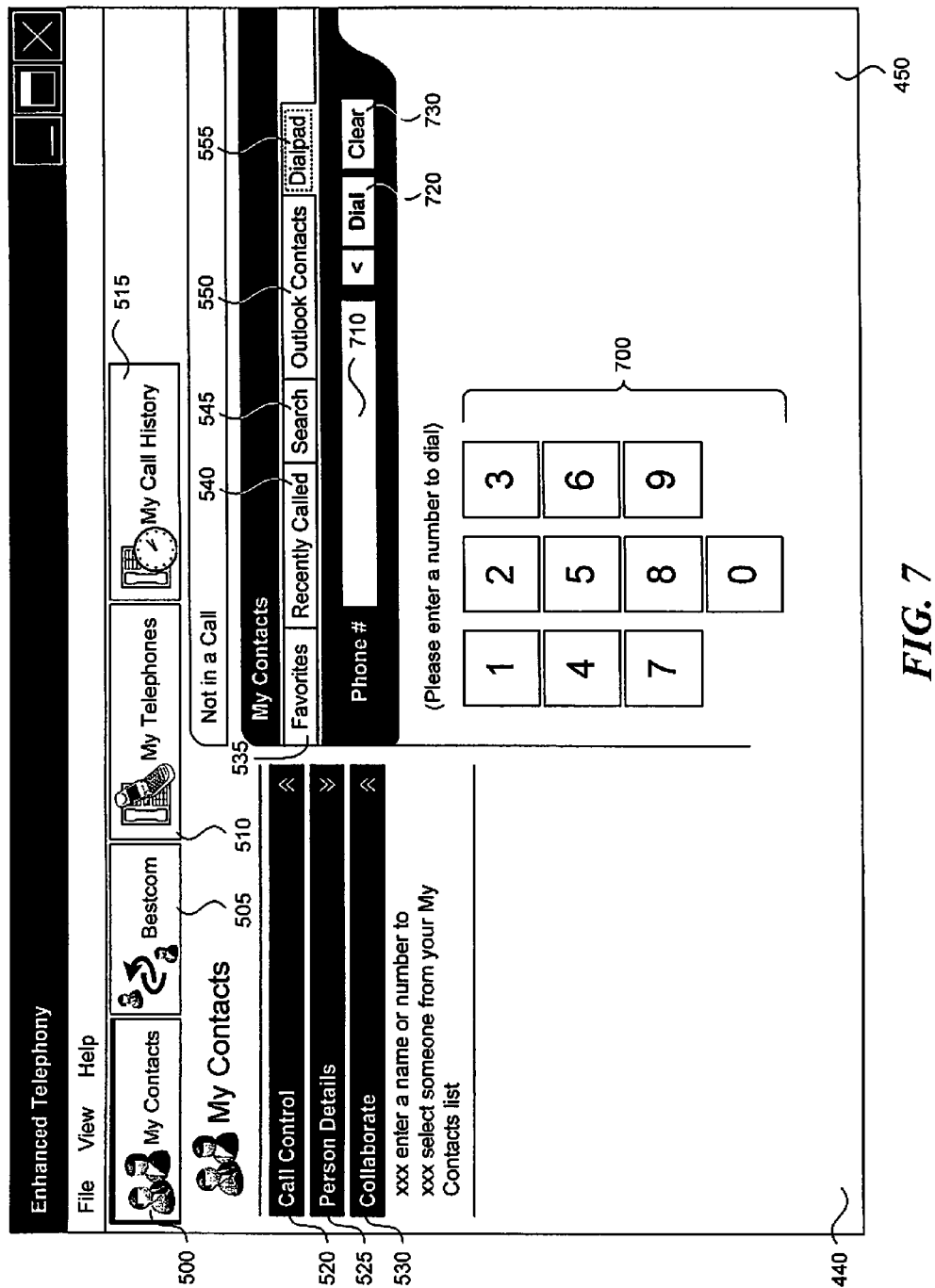
FIG. 7 illustrates the dialpad feature tab contained in the My Contacts environment shown in FIG. 5.

The "Dialpad" feature tab 555 of the ET user interface 200 allows explicit dialing of a telephone number. FIG. 7 illustrates the dialpad feature tab 555 contained in the My Contacts environment 500 shown in FIG. 5. When the user clicks on the "Dialpad" tab 555, a telephone dialpad 700 is displayed in the activity region 450. The user can use an input device (such as a stylus or mouse) to enter a telephone number in a text box 710 and click a Dial button 720 to dial the number. If the user makes a mistake entering the telephone number, a Clear button 730 can be used to erase the last number entered. The dialpad feature is useful on a computing device (such as a personal digital assistant (PDA)) where the user may not have a keyboard and may want to enter a number by tapping on the dialpad 700.

Placing an Outgoing Call

Figure 8:
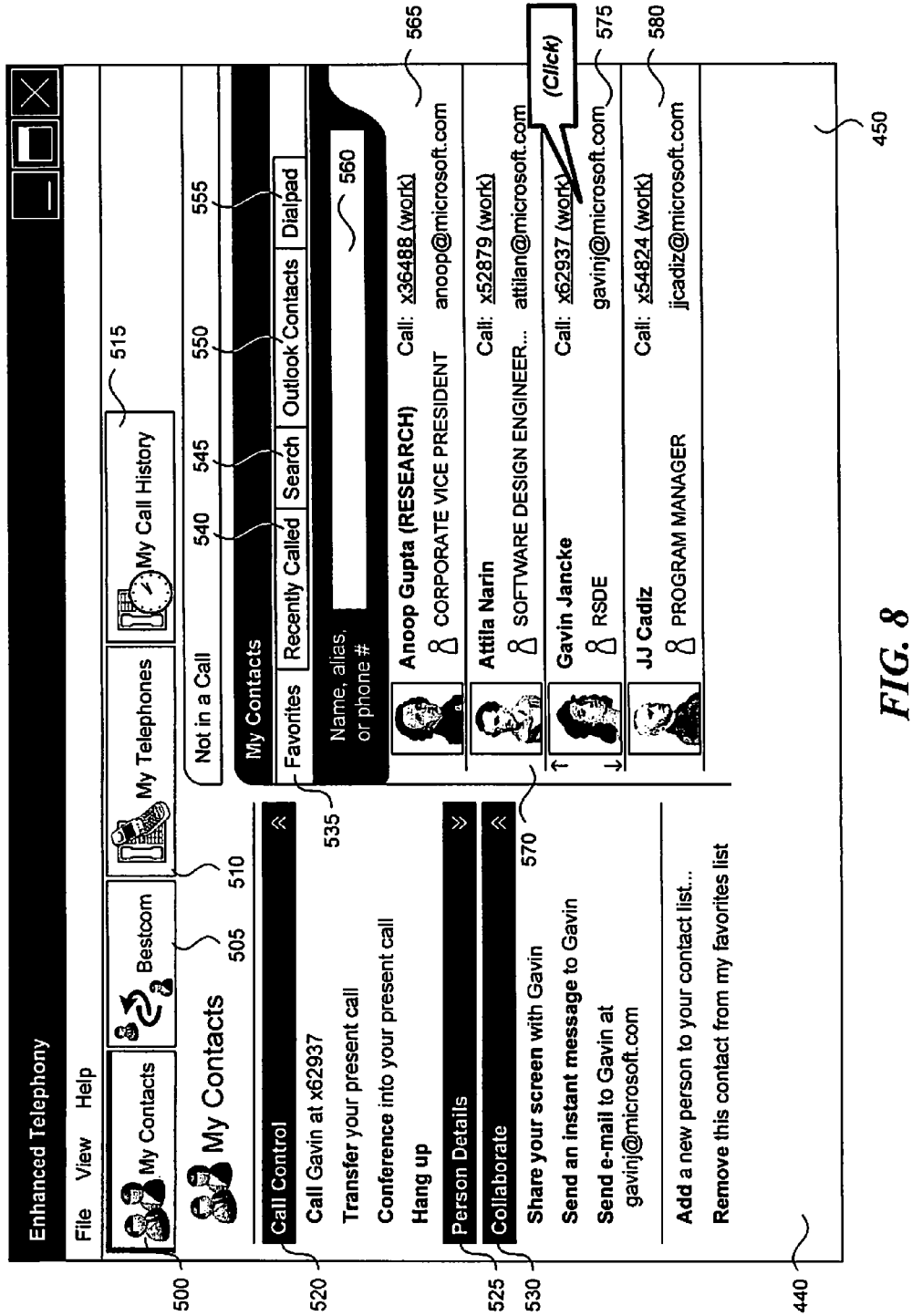
FIG. 8 illustrates the ET user interface as an outgoing call is initiated by a user.

Placing an outgoing call in the ET user interface 200 will now be explained with reference to FIG. 8. FIG. 8 illustrates the ET user interface 200 as an outgoing call is initiated by a user. To place a call, the user clicks on a desired number 800 (shown as the third contact 575). If the telephone 270 linked to the ET user interface 200 is a speakerphone, the speakerphone goes off hook and the user hears the familiar telephone ringing sound. In addition, if the linked telephone 270 has a display, the number dialed is displayed on the phone display along with the person being called. It should be noted that although the person being called was selected from the Favorites list (as shown in FIG. 5), the call could have been initiated by the user from any of the other tabs in the "My Contacts" environment 500.

Figure 9:
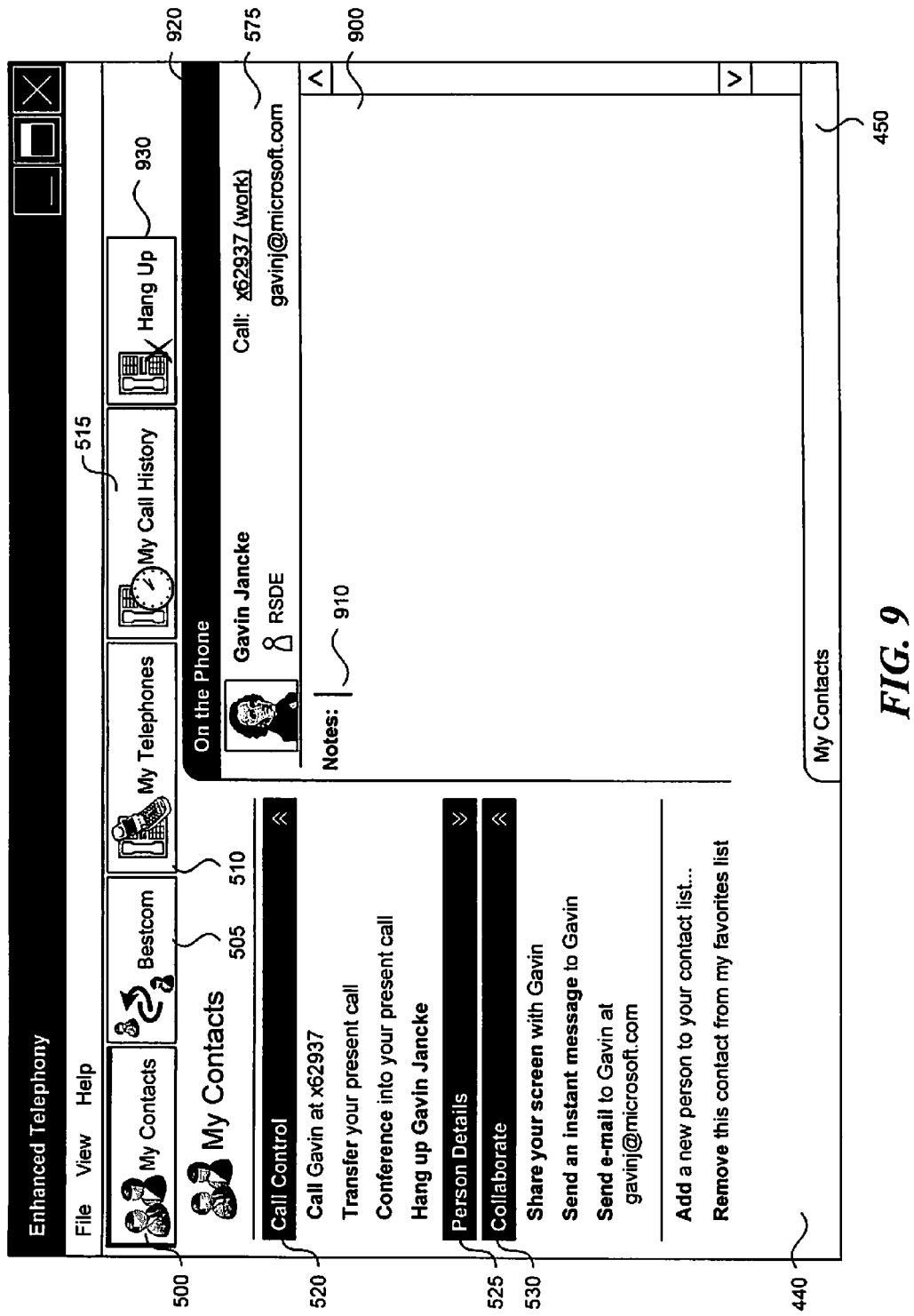
FIG. 9 illustrates the ET user interface during after the call initiated in FIG. 8 has been established.

FIG. 9 illustrates the ET user interface 200 during after the call initiated in FIG. 8 has been established. A call window 900 appears in the activity region 450 with the callee information 575 being displayed at the top of the call window. A notes area 910 is contained in the remainder to of the call window 900, which allows the user to use the notes feature discussed below. The call status region 430 indicates that the user is "On the Phone" 920. In addition, included in the environment button area is a hang-up button 930 that allows the user to terminate the call. In addition, the call may be terminated using the Hang Up process in the Call Control process region 520.

The call window 900 may also appear by the user picking up the telephone. When the ET user interface 200 receives input that the telephone is off the hook, the call window 900 appears asking the user what number he would like dialed. Moreover, if the user dials the call from the telephone, the ET user interface 200 displays an in-call window (described below) and automatically recognizes the number called (if the number is in the databases). Moreover, the ET user interface 200 can bring up an address book or the favorites list automatically whenever the user takes the telephone off hook.

The ET user interface 200 can be customized to implement a company's dialing plan and policy for outgoing calls. As a simple example, the company dialing plan may require a "9" to reach an outside line. As a more complex example, company policy may dictate that a long distance certain carrier be used at specific times of the day and another be used otherwise. The ET user interface 200 can be customized to implement a company's dialing policy automatically without continual user intervention. Thus, the user can enter (either by cutting and pasting or directly from an input device) a telephone number and the ET user interface 200 will take care of all dialing policies and procedures. For example, if the user does not know how to dial a foreign country he simply enters the number and as the ET user interface 200 to dial for him. As another example, when the user is in a hotel and needs to dial out, the ET user interface 200 takes care of all dialing protocols to place the call without the user intervention.

Another feature of the ET user interface 200 is advanced call "camp". If the user is trying to call someone and the person is unavailable, the advanced call camp feature notifies the user when the person becomes available and offers to place the call. In addition, the ET user interface 200 can use the callee's calendar to provide the user with the best times to call such that the person will be available. For example, the ET use interface 200 can monitor the messenger status of the person or the person's keyboard to determine when the person becomes available.

Other features can be used in the ET user interface 200 because it runs on a powerful PC that is linked and has access to a variety of databases. One such feature is the voice command feature. For example, with speech-to-text software (voice recognition software), the ET user interface 200 can process voice commands from the user. Thus, the user can vocally ask the system to call a certain person. For contacts with the linked databases, there is no training required. This is because the ET user interface 200 is linked to certain databases (such as the enterprise databases 320 and the personal databases 310) and is already aware of the contact being requested.

Call Transfer and Conference Calling Processes

Many telephones have the capability to transfer and conference calls. However, many people simply do not know how to use them. That is why many times you hear someone at the other end of the line say "if I lose you during this transfer or while trying to set up this conference call, please call back." The ET user interface 200 simplifies call transfer and conference calling for the user.

Figure 10:
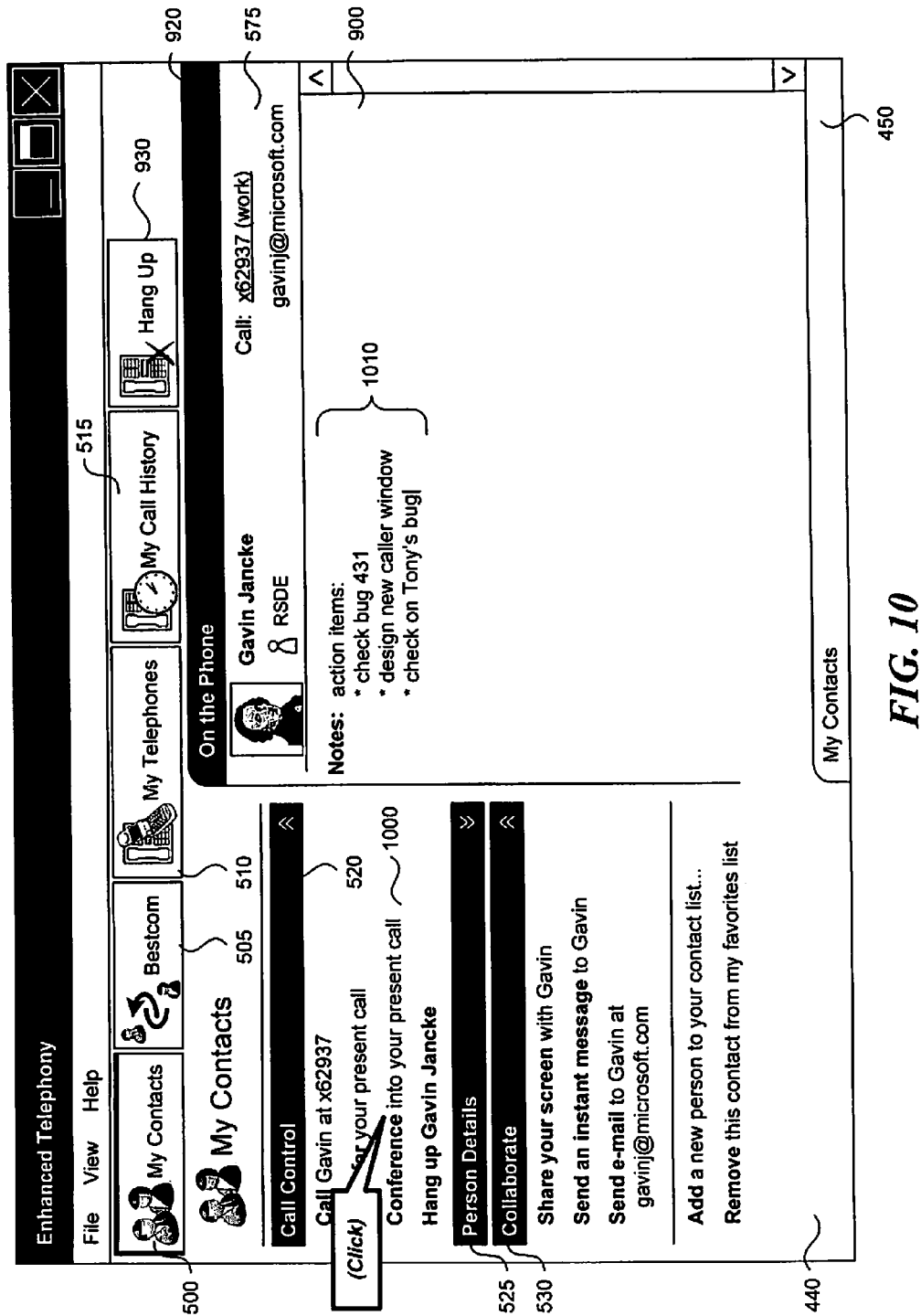
FIG. 10 illustrates the ET user interface during an establishment of a conference call by a user.
Figure 11:
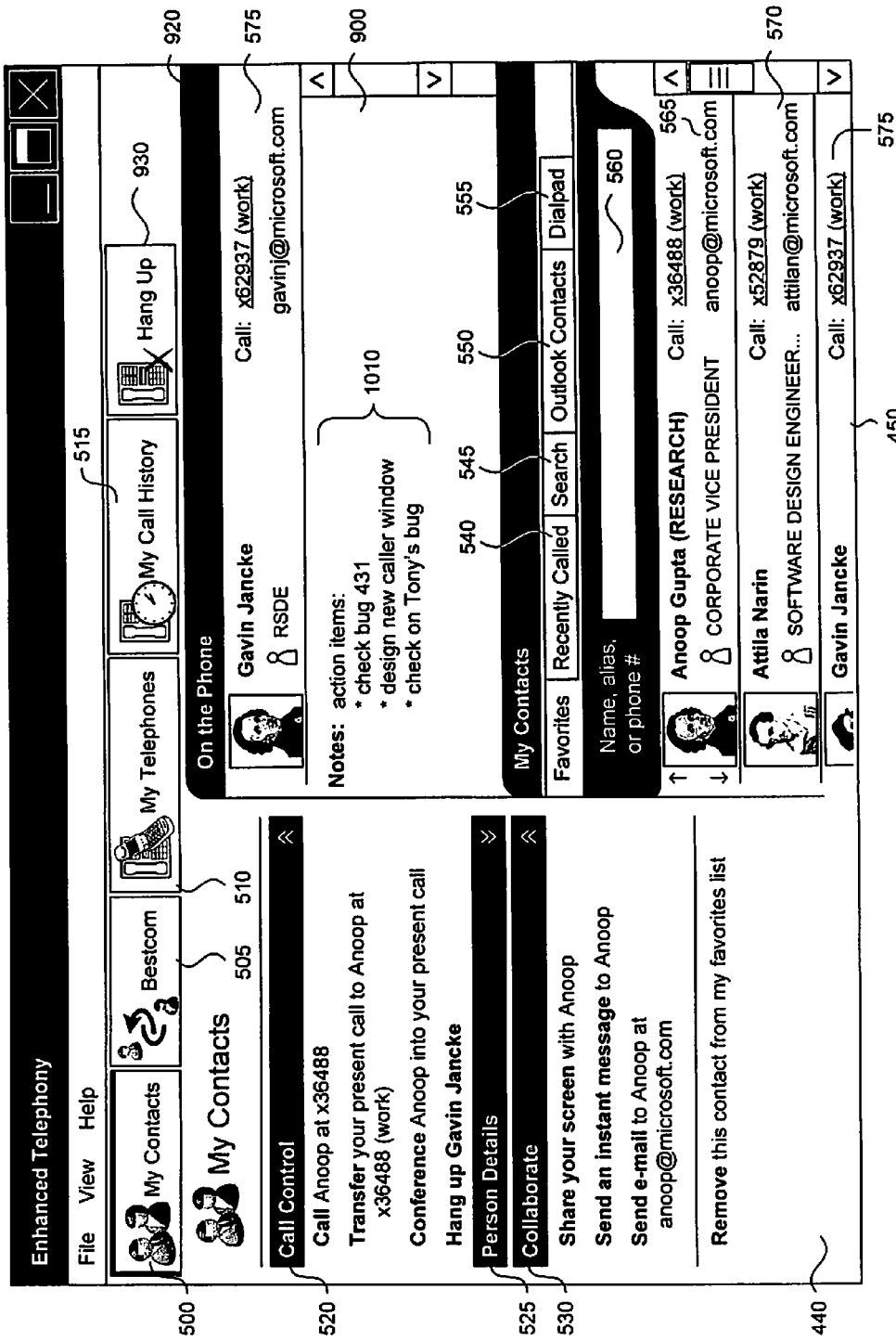
FIG. 11 illustrates the ET user interface providing the user with a choice of contacts to conference in after the user request shown in FIG. 10.

FIG. 10 illustrates the ET user interface 200 during an establishment of a conference call by a user. In particular, in order to establish the conference call the user clicks on a conference button 1000, under the "Call Control" process 520 in the process region 440. Note also that the user has made notes 1010 in the notes area 900, in accordance with the notes features discussed below. FIG. 11 illustrates the ET user interface 200 providing the user with a choice of contacts to conference in after the user request shown in FIG. 10. This gives the user all the features tabs of the "My Contacts" environment 500. In other words, the user can select contact from the Favorites tab 535, the Recently Called tab 540, the Outlook Contacts tab 550, or click the Search tab 545 to perform a search or the Dialpad tab 555 to use the dialpad to call. Using one of these methods, a person can be called and added to the conference call.

Figure 12:
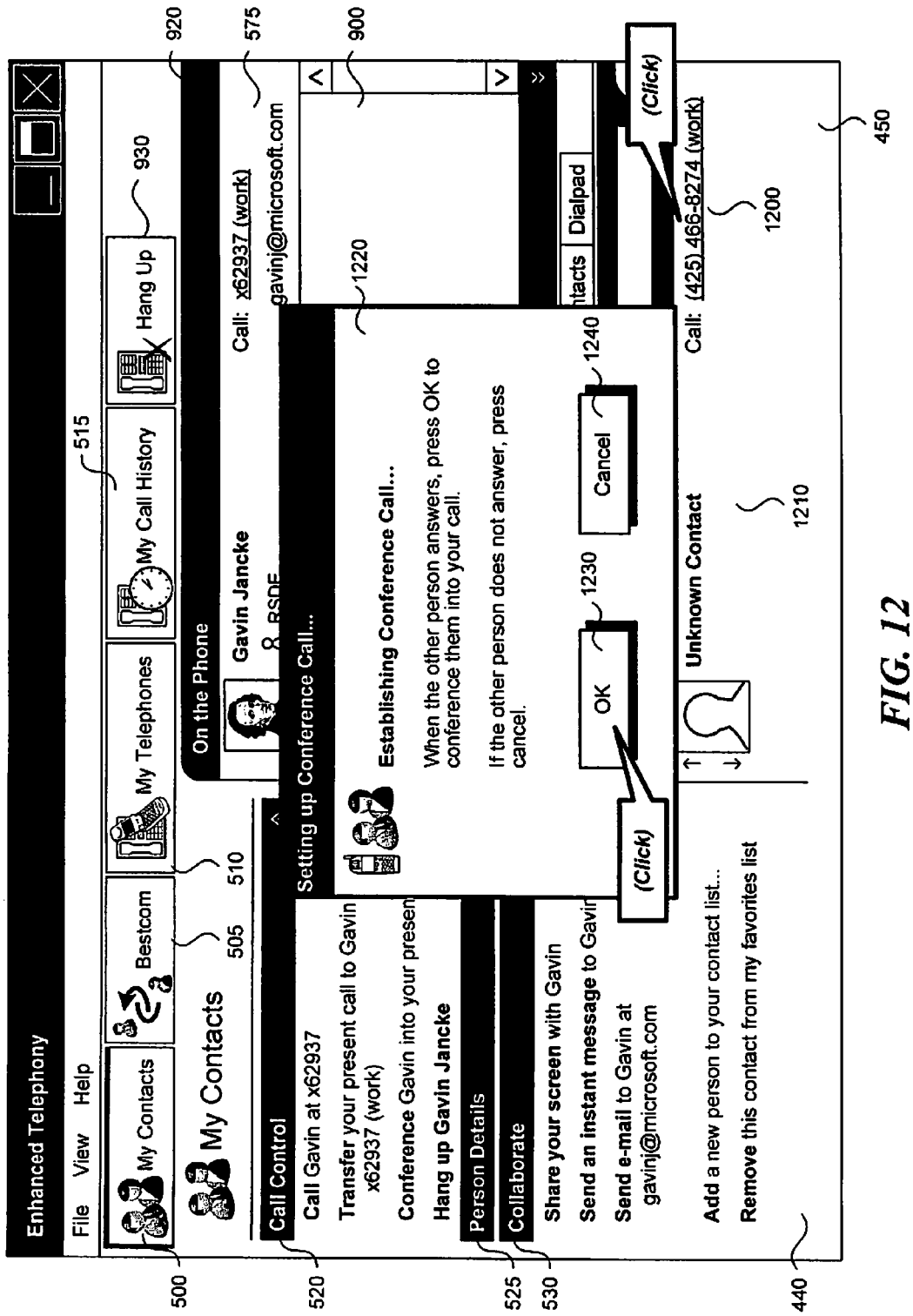
FIG. 12 illustrates the cues used by the ET user interface to update the user on the status of the conference call shown in FIGS. 10 and 11.
Figure 13:
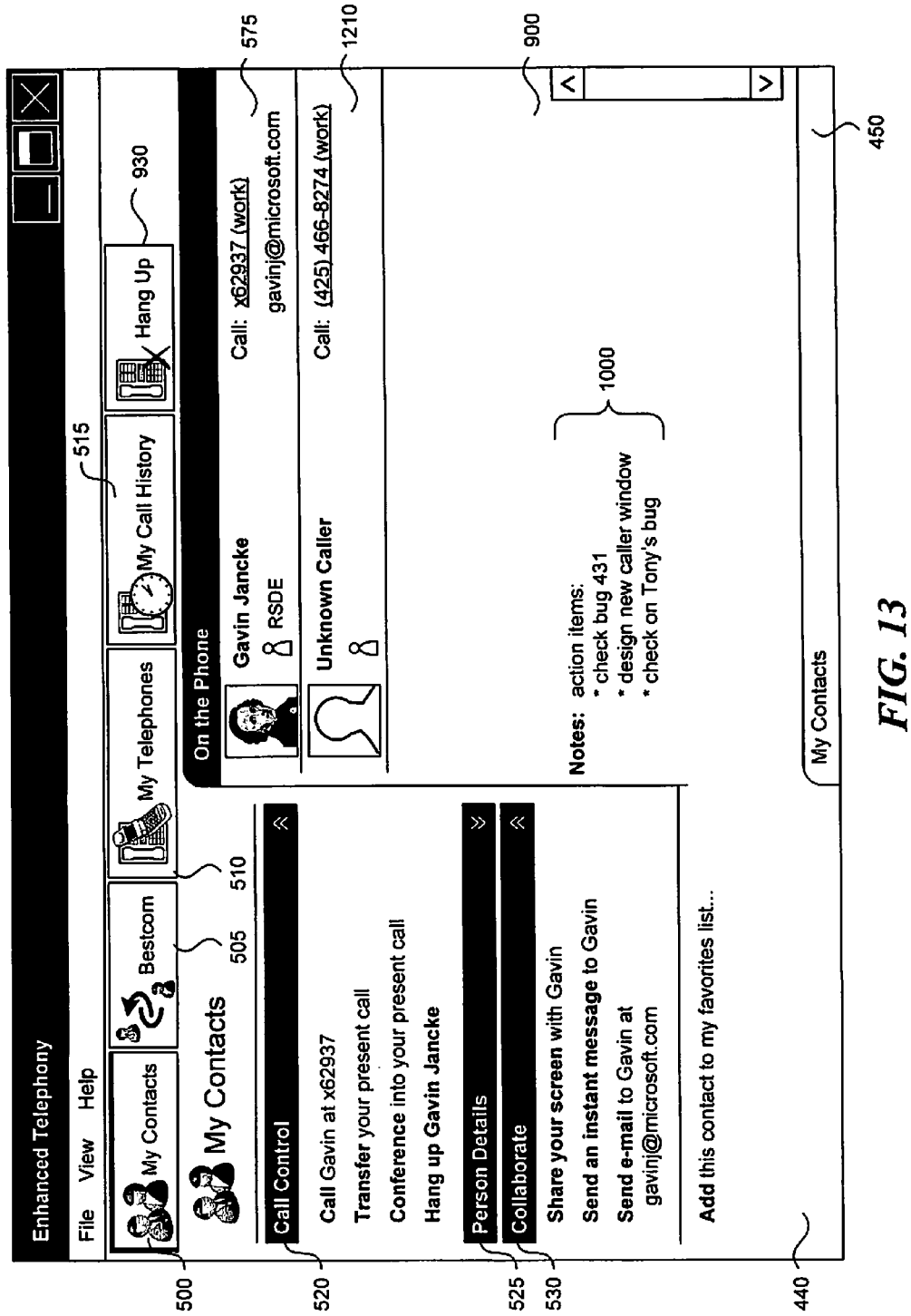
FIG. 13 illustrates the ET user interface during a conference call that includes two callers.

ET user interface 200 also provides visual and audio cues to the user regarding the status of the call. FIG. 12 illustrates the cues used by the ET user interface 200 to update the user on the status of the conference call shown in FIGS. 10 and 11. Specifically, the user selects a contact to include in the conference call and clicks on his telephone number 1200. As shown in FIG. 12, the contact is an unknown contact 1210 having an entry. A status window 1220 appears notifying the user that the person selected (the unknown contact 1220) is being included in the conference call. In addition to these visual cues, the telephone itself also provides audio cues (such as hearing the telephone dial). These audio cues provide the user with the capability to recognize any errors that may arise during the calling process and intercede. For example, if a line is busy, then the user can recognize that fact by hearing the busy tone and can choose to dial another number where the contact may be reached. The status window 1220 then informs the user to click "OK" 1230 when the person answers. This conferences the person into the conference call. If the person does not answer, the user can click "Cancel" 1240 to cancel the conference call. FIG. 13 illustrates the ET user interface 200 during a conference call that includes two callers, namely, the known caller 575 and unknown caller 1210.

There are a number of other ways that the ET user interface 200 allows a user to establish a conference call. One way is by allowing the user to drag and drop a contact from other user interfaces and applications (such as an Outlook contacts list) and conference in those persons. Another way is that the user can right click on a contact and select the line, "join conference call". Still another way is that the user can select all people on a "To:" line from an e-mail and right click on "conference call". All of the selected people then are joined into a conference call. Moreover, groups can be created so that the user need only click on the group to establish a conference call including everyone in the group. In some embodiments of the ET user interface 200, a synthetic voice or a recorded user voice is used to inform each contact being called for the conference call to wait until the entire conference call is established.

Incoming Call Features

Figure 14:
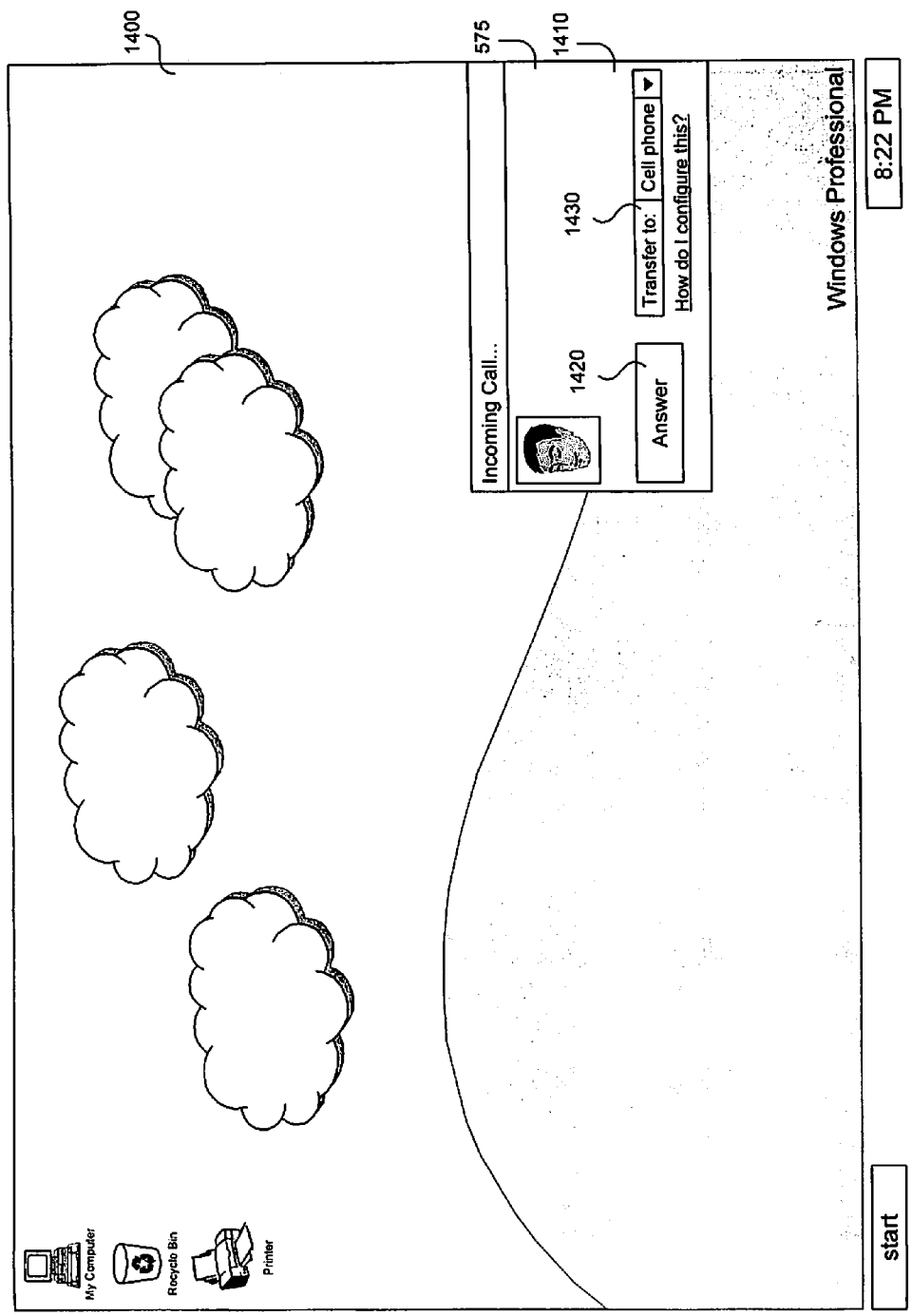
FIG. 14 illustrates the ET user interface during an incoming call.

The ET user interface 200 notifies the user of incoming calls both visually and audibly. FIG. 14 illustrates the ET user interface 200 during an incoming call. Visually, the user is notified on his desktop 1400 of the incoming call by an incoming call notification window 1410. If caller identification is available on the telephone network and the telephone number is in any of the linked databases, the window will include the entry of the caller 575 containing contact information discussed above. If the user decides to answer the call, he simply clicks the Answer button 1420 and is connected with the caller. The ET user interface 200 instructs the telephone to pick up (or go "off hook"). If the telephone is a speakerphone, the ET user interface 200 also instructs the telephone to go to speakerphone mode such that the user can either talk using the speakerphone or pick up the handset. The call notification window 1410 also includes a quick transfer button 1430 discussed below. With the quick transfer button 1430, the user is able to quickly transfer the incoming call to an alternate telephone.

The user also has a variety of options for the incoming call. The user can send an incoming call directly to voice mail by clicking a "Send Directly to Voice Mail" button (not shown) on the incoming call notification window 1410. Alternatively, this could be an option listed under the quick transfer button 1430. Either way, when the user clicks this option the ringing immediately stops and the caller is sent directly to voice mail. In another alternate embodiment, the ringing is silenced but the caller does not go directly to voice mail. Instead, the caller is sent to voice mail after the set number rings, but the ringing is silenced.

In addition, the ET user interface 200 provides the user with options when the user receives an incoming call while in a call. The ET user interface 200 allows the user in the call to send an instant message or e-mail to the caller notifying the caller that the user is on the phone and send the caller to voice mail. The voice mail can be caller-specific, whereby different voice mail messages are used dependent on the identity of the caller. For example, the user's supervisor and co-workers may get a more personalized voice mail message while those less familiar to the user may get less personalized and generic message.

The ET user interface 200 also gives a user call blocking options. The user may specify call blocking by clicking on a "block number and send to voice mail". Whenever the caller from the blocked number calls again, the call is sent directly to voice mail without ringing. Alternatively, the user may choose to block calls completely from that number, in which case the caller may hear a message stating that the user is no longer accepting calls from their number.

If the incoming caller is using the ET user interface 200, the caller can also receive alternatives to a busy signal. For example, if the caller tries to call the user but the user is on the phone, a dialog box will appear in the caller's ET user interface 200. The dialog box can give the caller a variety of options, such as leave a voice mail, send an e-mail, send an instant message, notify me when the user is off the phone, do nothing, just to name a few. If the "notify me when the user is available" option is selected, a dialog box pops up on the caller's screen when the user is available and asks the caller if he would like to place a call to the user.

The user is also notified audibly of the incoming call. This is accomplished using ring tones through speakers of the PC. The PC has much richer speakers than a cell phone or desk telephone and allow a greater variety of ring tones. In addition, any sound file can be used to indicate an incoming call. The ET user interface 200 permits a user to turn off the ringer on the telephone and have the ring of an incoming call broadcast through the PC speakers. The advantage to this is that you can have a unique ring from your neighbor because there is a wider variety of sound files to choose from for a PC than from a cell phone or telephone.

The ET user interface 200 also provides audio as well as visual caller identification through the use of caller-specific ring tones. This means that the user can hear not only that his phone is ringing, but hear who the call is from based on the ring tone. The user then can decide whether to answer the call. In another embodiment, the sound file identifying a caller can be in the caller's voice. By way of example, a caller may identify himself in his own voice as "this is James calling". Other embodiments of the ET user interface include text-to-speech conversion such that the textual caller identification is read and converted into speech. In this manner, a synthesized voice can announce that the user has an "incoming call from James."

The incoming call notification window 1410 can also include the calendar of the person calling (not shown). Based on the caller's calendar, the user may make different decisions about answering the incoming call. For example, if the user sees from the caller's calendar that the caller has free time now but is in meetings for the rest of the day, the user may choose to answer the call. Similarly, if the user sees from the calendar that the caller is out of the office today, the user can decide to answer the call because the caller may need help with a matter. This additional information provided by the user's calendar aids the user in deciding whether to answer the call.

Quick Transfer Feature

Figure 15:
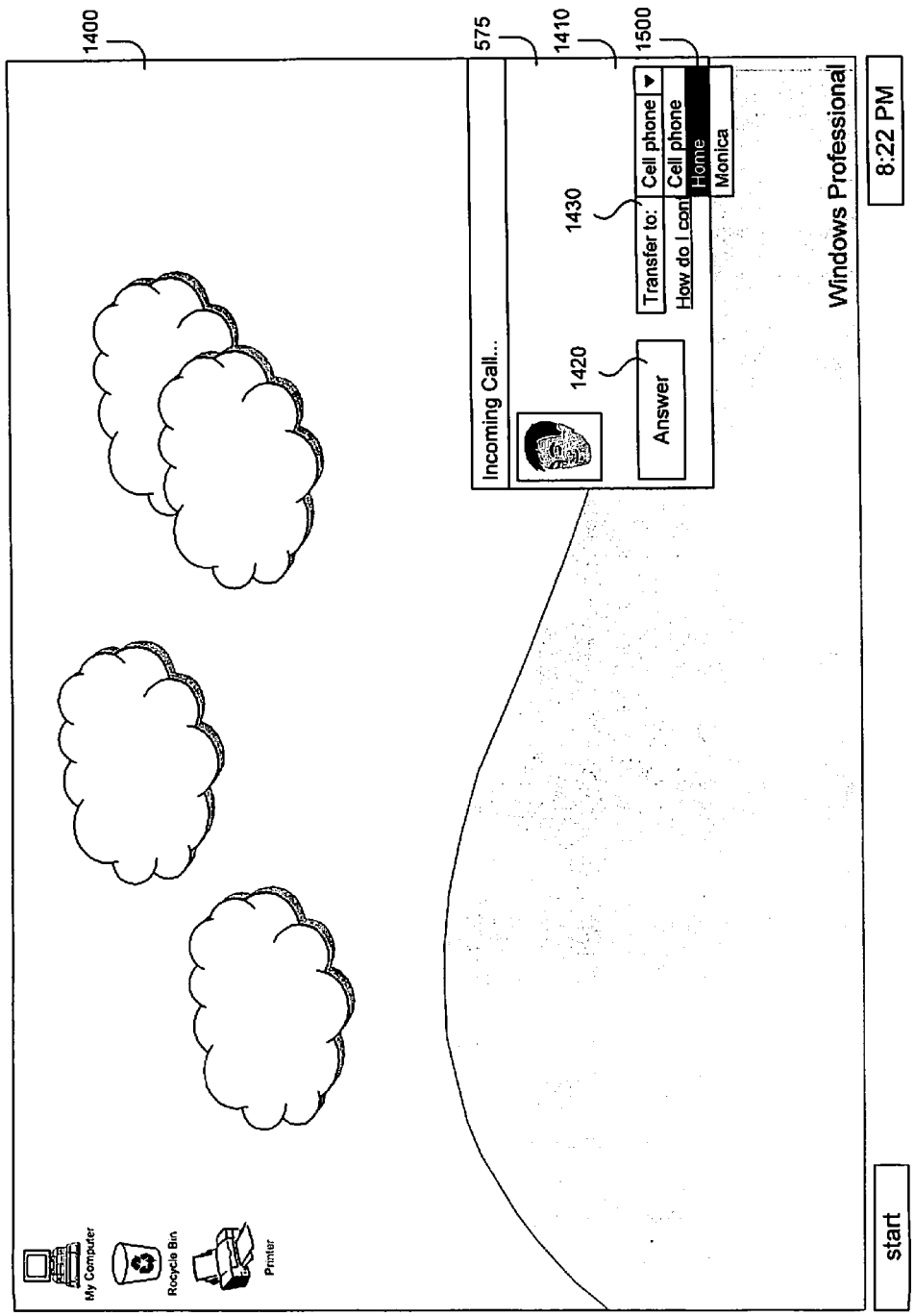
FIG. 15 illustrates the ET user interface during a quick transfer of the incoming call shown in FIG. 14.

Once a user is notified of an incoming call, the ET user interface 200 provides the user the option of performing a quick transfer. FIG. 15 illustrates the ET user interface 200 during a quick transfer of the incoming call shown in FIG. 14. Referring to FIGS. 14 and 15, the incoming call notification window 1410 includes the quick transfer button 1430 labeled, "Transfer to:". As shown in FIG. 15, the drop down vertical list 1500 includes the choices, "cell phone", "home" and "Monica". As noted above, the list 1500 may also include the option to send the caller directly to voice mail or to silence the ringing. This quick transfer feature can be used to transfer an incoming call to a telephone near the user when the user is away from the telephone being called. By way of example, suppose that the user is on the road and has his wireless notebook computer (running the ET user interface 200) and his cellular telephone. Back at his office is the user's work computer is running ET user interface 200 and his desk phone. Assume that an incoming call is received from someone calling the user's office telephone. As long as the user is connected to the network (such as via the wireless notebook computer), the user can use the quick transfer feature to immediately transfer the incoming call to the user's cell phone.

The user pre-configures the ET user interface 200 with the telephone numbers of locations where the user may be located. In addition, the calendar feature may be used to automatically determine the location of the user (based on his calendar) and add telephone numbers to the quick transfer list based on the calendar. This automatic population of the quick transfer list 1500 using calendar information allows the user to transfer incoming calls to a telephone at his present location. For example, if the user's calendar says that he is in a meeting in a conference room from between 9 and 10 in the morning, the ET quick transfer list 1500 would include the telephone number of the conference room during that time period. As shown in FIG. 15, the user has received notification of an incoming call at his work office and has activated the quick transfer button 1430 to ring the incoming call at his home telephone number. The quick transfer feature of the ET user interface provides flexibility and lessens the chance that the user will miss important calls.

Call Forwarding Feature

The ET user interface 200 provides a user access to a call forwarding feature that forward calls to other telephones under certain conditions. These conditions can be configured by the user. For example, the user may want all incoming calls forwarded to his cellular phone every time his computer is locked. Other call forwarding conditions include: (a) forward all calls when the screen saver comes on; (b) forward all calls when my presence status is set to away or busy; and (c) forward all calls at certain times. For example, on Tuesday and Thursday the user may telecommute, such that all calls on those days are forwarded to her home telephone. The call forwarding feature also can be integrated with the calendar feature such that the feature recognizes from the calendar the location of the user at a certain times of the day and forwards (or offers to forward) all calls to a telephone at that location or to the user's cellular phone.

The ET user interface 200 also includes a "call hunt" feature. If there is no answer at a first number, the call hunt feature keeps trying different numbers in a "hunt group" where the user may be found. The alternate numbers in the hunt group can be provided by the user or automatically configured based on information from the linked databases such as calendar information. For example, if a caller is trying to reach a user at the user's office but there is no answer, the ET user interface 200 can attempt to reach the user at alternate numbers, such as the user's cell phone.

Missed Call Feature

Figure 16:
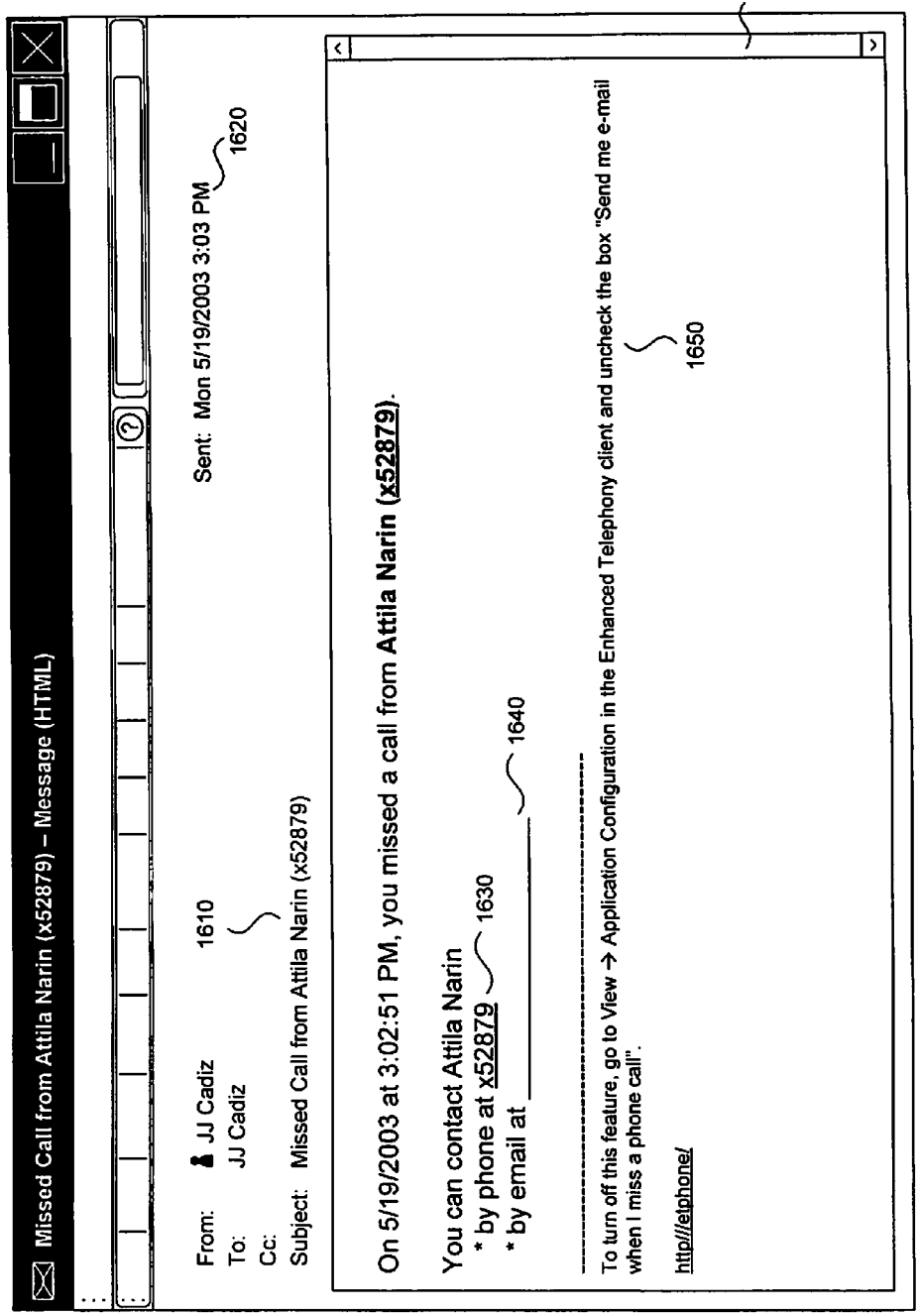
FIG. 16 illustrates an example of an e-mail notification sent by the ET user interface notifying a user of a missed call.

In the event that a user misses an incoming call, the ET user interface 200 provides a missed call feature. Typically, the missed call feature is activated when a call is missed and the caller does not leave a voice mail message. FIG. 16 illustrates an example of an e-mail notification 1600 sent by the ET user interface 200 notifying a user of a missed call. The e-mail notification 1600 can be sent to any device capable of receiving e-mail, such as a computer or a cellular phone. One aspect of the missed call feature is that the ET user interface sends the e-mail notification 1600 to the user setting forth the identity of the caller 1610, the time and date of the missed call 1620 and contact information. For example, as shown in FIG. 16, this contact information includes the caller's telephone number 1630 and the caller's e-mail address 1640. In addition, the e-mail notification 1600 includes instructions 1650 on how to turn off the e-mail notification feature.

The missed call e-mail notification 1600 can also contain buttons providing contact functionality. These buttons include a "call the missed caller back" button, an "e-mail the missed caller" button, and "use instant messenger to contact the missed caller" button. The user need only click any of these buttons to perform the desired action. The missed call notification e-mail 1600 also can use the caller's calendar information and present the caller's calendar. For example, the e-mail can contain a notice that says "you missed the caller, and here is her schedule for the day". Her calendar then is presented. The user then looks at the missed caller's schedule and decides the best time to return her call. The missed call notification e-mail also can contain even richer information, such as the caller's picture. In addition, the missed call notification e-mail 1600 can include the voice command feature such that a user can verbally command the ET user interface 200 to contact the caller by any available method.

In some situations the incoming caller may be unknown. This can occur when the incoming caller's telephone number or other contact information cannot be found in the linked databases. In this unknown caller situation, the ET user interface 200 includes an unknown caller feature that can take a variety of actions. First, the unknown caller feature can provide as much information as possible to the user about the unknown caller. This can be done, for example, by area code lookup or a search of public Internet sites. In other words, the unknown caller feature can display to the user the geographic region from where the call originated, based on the area code. In addition, the unknown caller feature can perform a search of public Internet sites to find a name for the telephone number. This can include searching public telephone books and other public records.

Figure 17:
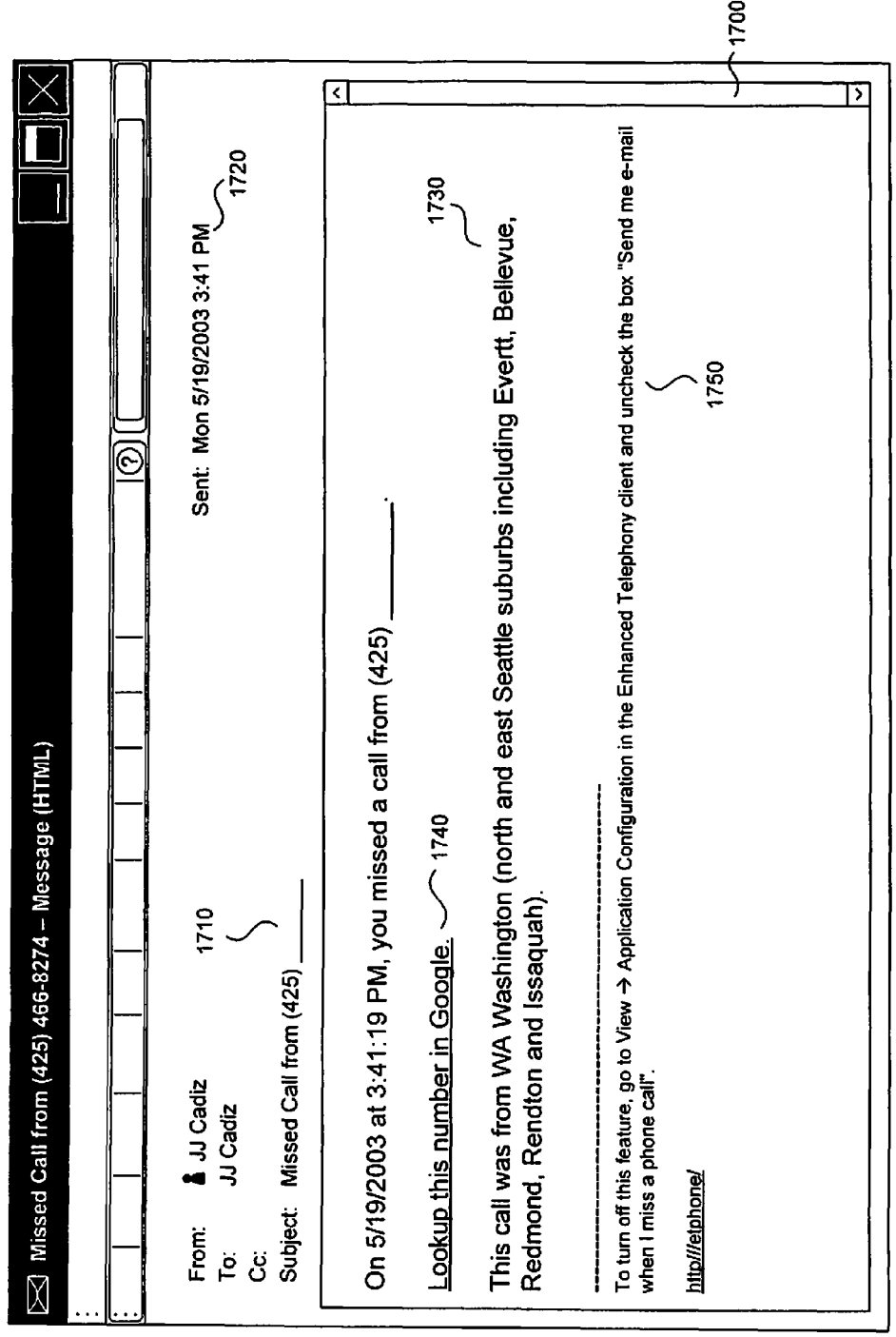
FIG. 17 illustrates an example of an e-mail notification for an unknown caller.

The e-mail notification is different in the situation where the caller is unknown. FIG. 17 illustrates an example of an e-mail notification for an unknown caller. The unknown caller e-mail notification 1700 can be sent to any device capable of receiving e-mail, such as a computer or a cellular phone. The ET user interface sends the unknown caller e-mail notification 1700 to the user setting forth the telephone number of the caller 1710, the time and the time and date of the missed call 1720. In addition, the unknown caller e-mail notification 1700 also includes geographic information based on the caller's area code and the ability to perform a search on public Internet sites 1740. The search is performed on the public Internet sites 1740 to perform reverse look-ups of telephone numbers. Moreover, the unknown caller e-mail notification 1700 includes instructions 1750 on how to turn off the e-mail notification feature.

The unknown caller feature also can intelligently determine whether the unknown caller e-mail notification should be standard or customized. The standard notification is based on the caller's name or number. There may be cases, however, when the name or number is not important, but, for example, the position of the person calling is important. For example, if a caller dials a corporation's main number and talks with an operator who then transfers the call, the standard e-mail notification would identify the caller as the company operator. In this situation, the operator's position is more important that the operator's name or number, and a customized e-mail notification would be sent. The ET user interface 200 can use linked databases (such as the enterprise database) to decide whether to send standard or custom e-mail notification.

In-Call Features

The ET user interface 200 provides can display several features and processes to a user during the initial stages of a telephone call and during the call.

Screen Sharing Feature

The screen sharing feature allows a user's computer to send instructions to display visual data to the computer attached to the caller's telephone. In other words, screen sharing is enabled if the user and a caller are in a call and if both callers are on the corporate network. There are two implementations of the screen sharing feature. A first implementation involves sharing the contents of the user's screen one or more callers. As shown in FIG. 5, if the user is talking to a caller and wants to share his screen, the user clicks the "share your screen" button under the Collaborate process 530. The caller then receives a message confirming that this is approved by the caller. This establishes a screen-sharing session between the user and caller. The screen call feature can be configured to share only a part of the screen, all of the screen, or an application-specific part of the screen (for example, the word-processing document open in a window on the screen. When the call is terminated, the screen-sharing session is automatically discontinued and all windows associated with the call and session are automatically cleaned up.

A second implementation of the screen sharing feature is a screen call feature. The screen call feature allows a user to call a business and to receive from the business a web page or other visual data associated with the business. The business has previously programmed its computer to send all callers its web page or other visual data. The screen call feature merges audio features of the telephone and PC with the visual features of the PC to provide information in a business setting. For example, assume that the user calls his favorite restaurant. While the user is on hold, the screen call feature can bring up the restaurant's web page, menu or available reservations, so that the user can browse this information while on the phone. Moreover, depending on its product or services, a business could provide information to the user via screen sharing such as a list of frequently asked questions, a movie listing, and a pricing list, just to name a few. The screen call feature also may be used to ease the burden of phone menu trees that require a user to select an option numerous times to get to the desired option. Using the screen call feature, the business could share its phone menu tree, thereby allowing the user to click on the menu tree for the desired option and letting the ET user interface 200 handle the task of reaching that option.

In addition, the ET user interface 200 includes an easy transfer feature that sends a file while in the call. This easy transfer feature shares multiple copies of the file while in a call with whomever the user chooses. By way of example, if the user is in a conference call with three other callers and they are discussing a document that the other three do not have, the user can click the easy transfer button and a copies of the document appears on the desktop of each of the three callers.

PC Audio Feature

The ET user interface 200 can adjust parameters on the PC based on the user's telephone usage. This is made possible by the fact that the ET user interface 200 is aware of the telephone and can act intelligently accordingly. Thus, the moment the ET user interface 200 knows what the phone is doing the ET user interface 200 can adjust certain parameters on the PC. For example, when the user picks up the telephone the audio on the PC is affected. This means that the audio on the PC may be muted or lowered, as desired by the user. In addition, the PC shows a visual indication that the volume has been affected. For example, the volume icon displayed on the screen may shown that the audio has been muted. Alternatively, a message may be displayed that the audio has been muted or turned down.

If the user is listening to music when a call is received or placed, the audio can be muted upon initiation of the call. In addition, the PC can pause the music at that location instead of turning the music off and forcing the user to listen to the beginning of a song upon termination of the telephone call. If the telephone call is, for example, a voice over IP (VOIP) call, the PC will sense this and act accordingly by switching the speakers from the audio to the telephone call and activating the microphone.

An alternate embodiment includes automatically lower the audio instead of muting it. In other words, upon receipt of initiation of a call, the audio is slowly lowered and then muted, while the music is paused. Upon call termination, the music is unpaused and then the audio volume is raised from mute to the previous level before the telephone call. This embodiment avoids the situations where the user has his audio on at a high volume, takes a phone call, and then upon termination of the call the audio returns to its high volume, thereby startling the user.

Notes Feature

The notes features of the ET user interface 200 provides support the user while in a call, while making a call, and while receiving a call. Referring to FIGS. 9 and 10, during the call, can take notes (such as action items) in the notes area 910. The user can take notes during the call and the notes will become part of the call history. In this manner, any notes made during a call are associated with the call. The notes can be any type of notes, such as text notes or Tablet PC format. In addition, these notes can be stored and indexed. This allows the user to search the notes using the search feature described above.

The notes features also can intelligently create headers and associations for the notes made during the call. These headers and associations can be automatically generated from data available to the ET user interface 200, such as Outlook calendar data. For example, if the user has a meeting request in her calendar during the period that a call is placed or received, the notes feature looks to the Outlook calendar data to see what is scheduled. If, for example, there is scheduled a meeting to discuss a sale of a product, this data can be used to create a header for any notes created during the call, where the header states that the notes related to the sale. The notes feature attempts to match the call with the calendar items using, for example, caller identification, a meeting identification, or attempts to match the information between the calendar and the call. If a match is detected, the notes feature associated the notes created during the call with the meeting. In addition, this calendar data can be used to create note headers and such.

Event History Feature

The ET user interface 200 also can display an event history associated with one or more callers. This event history can be displayed for both incoming and outgoing calls to a particular caller for whom the user has had prior contact. The event history contains events such as appointments, prior telephone conversations, e-mails, notes and documents associated with a caller. The events are associated with the caller at the time of a call, and when the caller calls again, links to the events are displayed in the ET user interface 200. The event history can be displayed for a caller in the incoming call notification window and when the user is placing an outgoing call. Through the ET user interface 200, the user also can manually edit the event history to make it more useful.

By way of example, assume that a user receives a call from a caller with whom the user has had previous conversions. Further assume that the user and caller have previously discussed a certain document, which the user has opened during the course previous telephone conversations. These document may be, for example, a word processing or a spreadsheet document. The event history feature has previously linked that document with the caller and his previous telephone calls to and from the user. When a call is received from the caller, the incoming call notification window includes a listing of the document associated with the caller, and includes a link to the documents to enable the user to quickly open the document while answering the call. In other words, when a call is placed or received from the same caller at a later time, the event history feature remembers the events associated with the caller and the ET user interface 200 provides a list of those events during incoming or outgoing calls to the caller.

Other Uses of the Telephone

The ET user interface 200 allows a telephone to be used in other less traditional ways. For example, the ET user interface 200 can be used to provide wake-up calls or meetings reminders for the user. The user would simply enter into the ET user interface the times she wanted her phone to ring to be reminded of something or awakened. At the prescribed time, the telephone is directed to ring and the a reminder or wake-up call is provided. Moreover, the telephone can be used as an intercom (such as between offices). A user requests to intercom another person and an intercom request is sent to the person. The person's ET user interface 200 receives the intercom request and instantly takes the person's telephone "off hook". The user and the person then are connected in an intercom setting.

"My Call History" Environment

The My Call History environment 515 provides a user with access to a history of all call activity within a previous period of time. In its basic form, the call history feature tracks all incoming and outgoing calls, including the length of call, participants, when and where the call occurred. Richer versions of the call history feature also include notes associated with the calls. The call history also can include an event history for each call, containing events associated with a particular caller. Other versions of the call history feature include tracking of all transferred, forwarded and missed calls, including a message that an e-mail was sent notifying the user of any missed calls). The call history feature can be configured to display information for multiple phones, such as a work phone, home phone, and cell phone. Moreover, the call history feature contains the capability to dial directly. In other words, while viewing the call history in the ET user interface 200, a user need only click on a telephone number to initiate a call to that person.

The call history feature can include a statistical summary of call usage. This statistical summary provides a succinct digest of a user's telephone behavior over a certain time period. For example, the statistical summary may inform the user of the number of calls he made today and the average number of minutes per call, and the average number of minutes spent on the telephone during the day or week. In addition, the statistical summary can provide reports chronicling a user's time spent on the phone for each day, each month, or some other time period. The call history feature can be configured to automatically remove call history logs and information after a specified time period. The time period may be determined, for example, by a company's retention policy.

Figure 18:
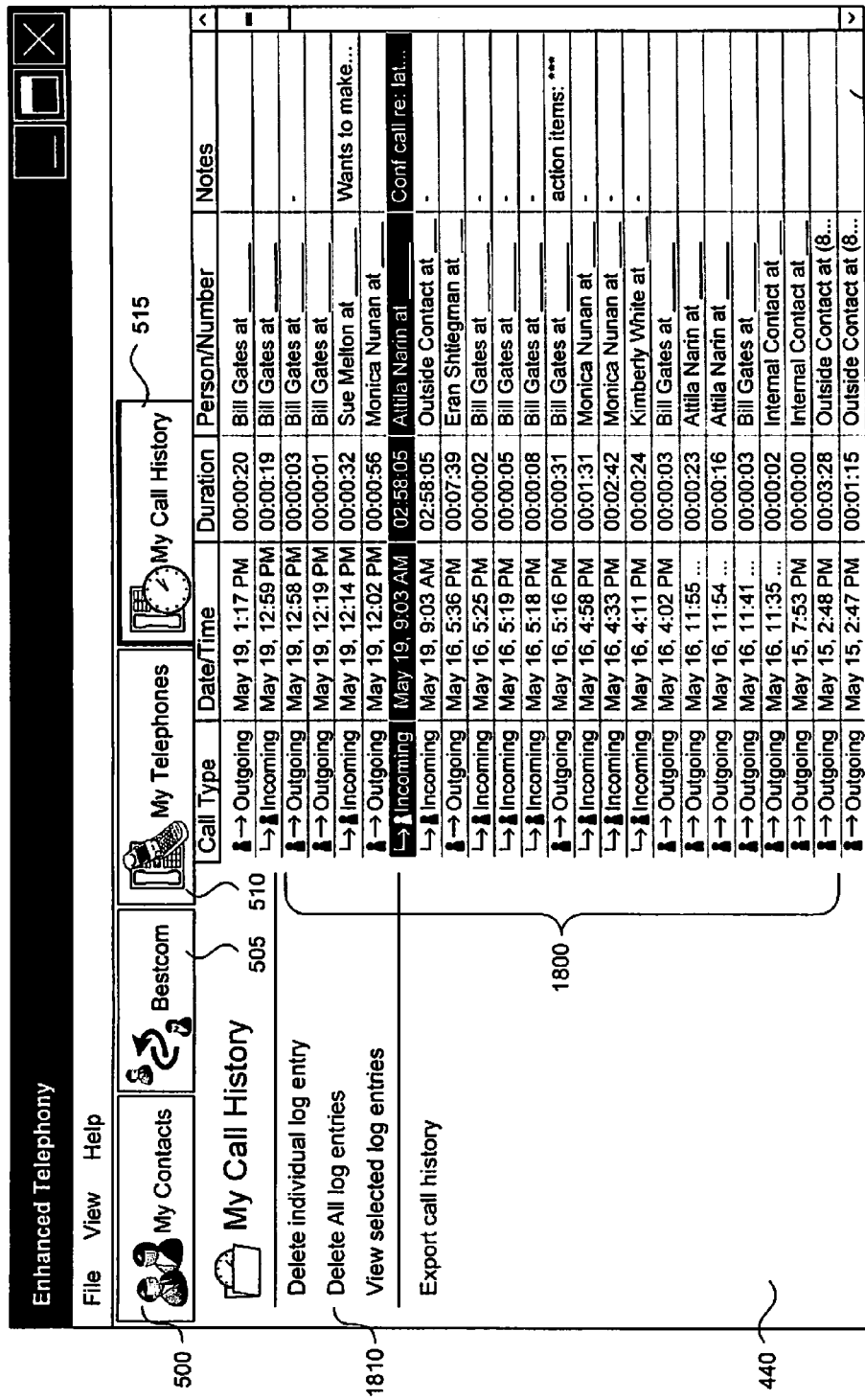
FIG. 18 illustrates an example of the Call History environment.

FIG. 18 illustrates an example of the Call History environment 515. A call history log 1800 is displayed in the activity region 450. This log 1800 contains a list of all incoming and outgoing calls as well as a preview of any notes that were taken during the call. If the user double clicks on an entry in the log 1800, a window is opened detailing the basic information (such as data/time of the call, caller, telephone number) and all the notes. Processes 1810 for modifying the log 1800 are shown in the process region 440. In particular, the processes 1810 include deleting individual log entries, delete all log entries, view selected log entries, and export the call history. Other processes may be added depending on the needs to the individual or enterprise.

My Telephones Environment

The My Telephones environment 510 allows a user to identify, configure and manage the telephones in communication with the ET user interface 200. Identification and configuration such that the telephones will communicate with the ET user interface 200 can be performed manually or automatically. Automatic identification and configuration is performed based on the linked databases. The My Telephones environment 510 also provides status information regarding telephone and network connectivity.

Bestcom Environment

The Bestcom environment 505 is a communication preferences environment that provides a user with a means to configure and communicate to others the user's preferred modality of being contacted. In other words, the Bestcom (or communications preferences) environment 505 uses rules to route calls. These rules allow a call to be forwarded to a number based on a certain condition. For example, the user may state that his communications preferences are to have all calls forwarded to a certain number (such as his home phone) whenever his computer is locked. In addition, communication preferences of the use can be configured and communicated to others. For example, if a user prefers to be contacted by e-mail, this can be communicated to others through the ET user interface 200 (such as using an icon or text message). The communications preference environment 505 allows the user to notify potential callers of the way in which the user prefers to be contacted, thus improving the chances of contacting each other.

The ET user interface 200 serves as a means to collect and disseminate the user's communication preferences. The way these preferences are communicated include in the contact information, such as next to the person's telephone number and picture, and a communication preferences icon of some common states such as, for example, do not telephone, prefer e-mail, and please call. Because they are located in the contact information, these communication preferences would show up to a user searching for someone.

As an example, a user could set her communication preferences to certain settings such as: (a) please call any time; (b) prefer e-mail, but call if it is important; (c) please do not call; (d) send e-mail or stop by. These are merely examples of the multitude of settings that are available to convey the user's preferences. In addition, there could be other variations and dimensions to these communication preferences settings. For example, the settings may be based on the date, the time of day, the caller, and the user's presence status, to name a few.

Figure 19:
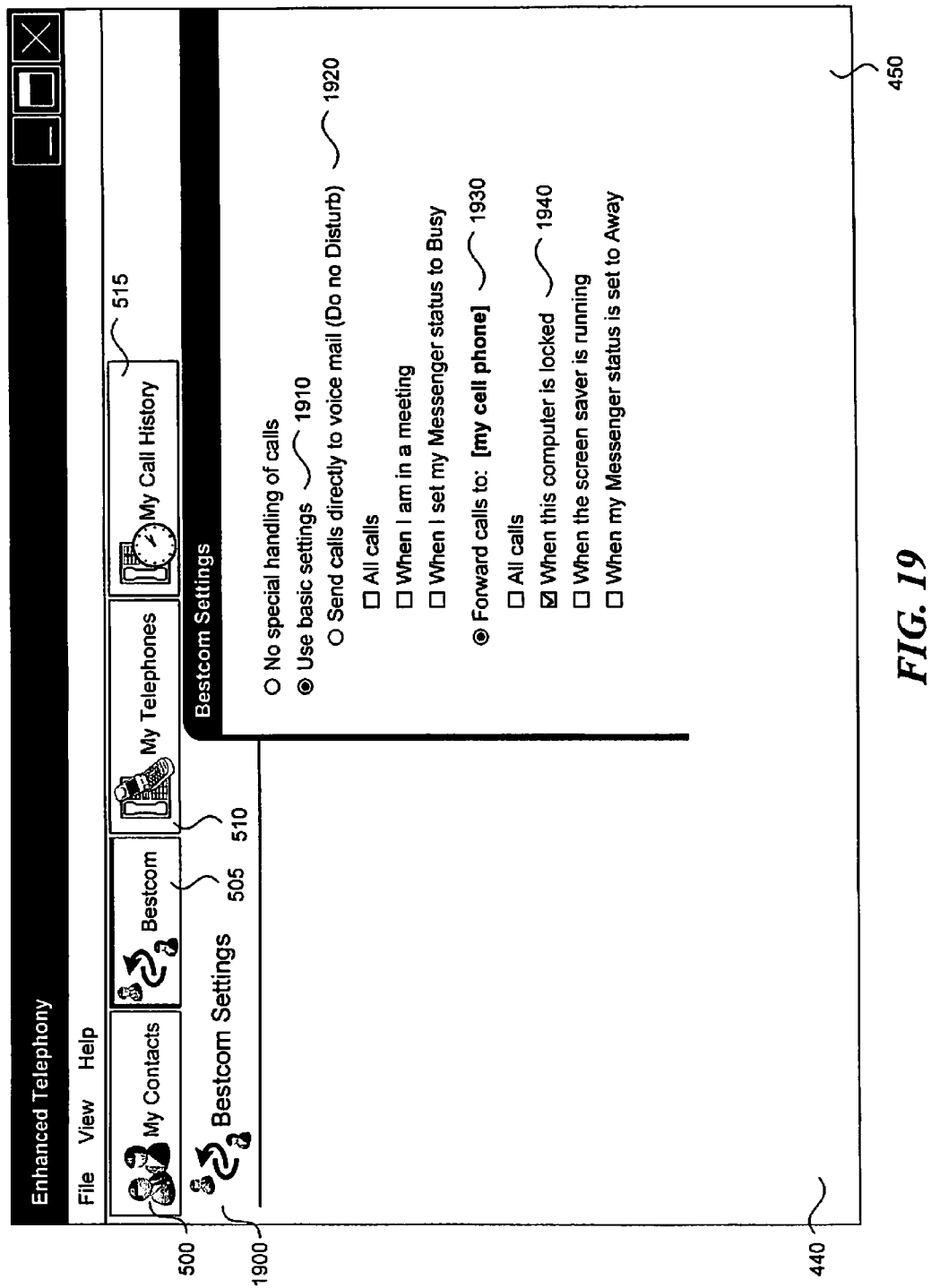
FIG. 19 illustrates the settings process in the communication preferences environment of the ET user interface.

FIG. 19 illustrates the settings process in the Bestcom or communication preferences environment 505 of the ET user interface 200. The process region 440 includes the Bestcom Settings process 1900, which allows the user to set communications and call forwarding preferences. As shown in FIG. 17, the user interface options for the Bestcom Settings process 1900 are displayed in the activity region 450.

In particular, the Bestcom Settings process 1900 allows the user to use the basic settings 1910 configured by the user. The user has the option of a Do Not Disturb status 1920, which sends all incoming calls directly to voice mail. In this example, the user has configured the settings such that an incoming call is forwarded to her cell phone 1930. This is performed only when the computer is locked 1940. Other settings are possible, as shown in FIG. 19. For example, the user can forward all calls to her cell phone. In addition, the PC can have a connected microphone that distinguishes between voices or a camera connected to the PC running face recognition software that detects other people in the room (other than the user). If the PC detects more than one person in the room or otherwise determines that there are persons other than the user in the room (either through audio or visual means), then the PC can automatically configure the settings to send all incoming calls to voice mail. Moreover, the settings can include a "breakthrough" list that allows call from certain people to get through. For example, a user may not want to be disturbed unless an incoming call is from a manager or a spouse.

The Bestcom environment 505 also allows remote notification and modification of settings. For example, the user can request by e-mail the current settings of the ET user interface. Once received, the user may decide to modify the settings. The modified settings can be e-mailed back to the ET user interface and applied.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method for controlling audio output rendered from a computing system, the method comprising: the computing system rendering media at one or more speakers at a particular volume setting; the computing system detecting a telephone call; the computing system, upon detecting the telephone call, automatically pausing the media; the computing system, after pausing the media, lowering the particular volume setting of the media, such that the particular volume setting of the media is lowered to a new lower volume setting while the media is paused; the computing system detecting a termination of the telephone call; and the computing system unpausing the media and resuming rendering of the media at the one or more speakers at the new lower volume setting, which is not completely muted.

2. The method of claim 1, wherein the method further includes activating a microphone for the telephone call.

3. The method of claim 1, wherein the method further includes displaying a visual indication that the particular volume has been modified.

4. The method of claim 1, wherein the method further includes restoring the media to the particular volume upon detecting that the telephone call has terminated.

5. The method of claim 1, wherein detecting the telephone call comprises detecting an incoming telephone call.

6. The method of claim 1, wherein detecting the telephone call comprises detecting an outgoing telephone call.

7. A computer program product comprising: one or more computer storage device comprising non-volatile storage having stored computer-executable instructions which, when executed by one or more computer processor of a computing system, implement a method comprising: the computing system rendering media at one or more speakers at a particular volume setting; the computing system detecting a telephone call; the computing system, upon detecting the telephone call, automatically pausing the media; the computing system, after pausing the media, lowering the particular volume setting of the media, such that the particular volume setting of the media is lowered to a new lower volume setting while the media is paused; the computing system detecting a termination of the telephone call; and the computing system unpausing the media and resuming rendering of the media at the one or more speakers at the new lower volume setting, which is not completely muted.

8. The method of claim 7, wherein the method further includes activating a microphone for the telephone call.

9. The method of claim 8, wherein the method further includes displaying a visual indication that the particular volume has been modified.

10. The method of claim 9, wherein the visual indication is an icon that shows the particular volume has been lowered.

11. The method of claim 7, wherein the method further includes restoring the media to the particular volume upon detecting that the telephone call has terminated.

12. The method of claim 7, wherein detecting the telephone call comprises detecting an incoming telephone call.

13. The method of claim 7, wherein detecting the telephone call comprises detecting an outgoing telephone call.

14. A computing system comprising: a speaker; at least one processor; and system memory having stored computer-executable instructions which, when executed by the at least one processor of a computing system, implement a method comprising: the computing system rendering media at one or more speakers at a particular volume setting; the computing system detecting a telephone call; the computing system, upon detecting the telephone call, automatically pausing the media; the computing system, after pausing the media, lowering the particular volume setting of the media, such that the particular volume setting of the media is lowered to a new lower volume setting while the media is paused; the computing system detecting a termination of the telephone call; and the computing system unpausing the media and resuming rendering of the media at the one or more speakers at the new lower volume setting, which is not completely muted.

15. The method of claim 14, wherein the method further includes activating a microphone for the telephone call.

16. The method of claim 14, wherein the method further includes displaying a visual indication that the particular volume has been modified.

17. The method of claim 16, wherein the visual indication is an icon that shows the particular volume has been lowered.

18. The method of claim 14, wherein the method further includes restoring the media to the particular volume upon detecting that the telephone call has terminated.

19. The method of claim 14, wherein detecting the telephone call comprises detecting an incoming telephone call.

20. The method of claim 14, wherein detecting the telephone call comprises detecting an outgoing telephone call.

* * * * *